US010723555B2

(12) United States Patent
Hance et al.

(10) Patent No.: US 10,723,555 B2
(45) Date of Patent: Jul. 28, 2020

(54) ROBOT INVENTORY UPDATES FOR ORDER ROUTING

(71) Applicant: Google LLC, Mountain View, CA (US)

(72) Inventors: Chris Hance, San Jose, CA (US); Thibault Vrevin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 192 days.

(21) Appl. No.: 15/843,581

(22) Filed: Dec. 15, 2017

(65) Prior Publication Data

US 2019/0062055 A1 Feb. 28, 2019

Related U.S. Application Data

(60) Provisional application No. 62/551,181, filed on Aug. 28, 2017.

(51) Int. Cl.
*B65G 1/137* (2006.01)
*G06Q 10/08* (2012.01)
(Continued)

(52) U.S. Cl.
CPC ........... *B65G 1/1373* (2013.01); *B65G 1/137* (2013.01); *B65G 67/04* (2013.01); *G01C 21/343* (2013.01);
(Continued)

(58) Field of Classification Search
CPC ...... B65G 1/1373; B65G 1/137; B65G 67/04; G06Q 10/087; G06Q 10/083;
(Continued)

(56) References Cited

U.S. PATENT DOCUMENTS 5,625,559 A 4/1997 Egawa
7,055,741 B2 6/2006 Bong et al.
(Continued)

OTHER PUBLICATIONS http://freightwhisperer.com/2016/12/11/what-does-ltl-stand-for-in-the-transportation-trucking-industry/ (http://freightwhisperer.com/2016/12/11/what-does-ltl-stand-for-in-the-transportation-trucking-industry/.

(Continued)

*Primary Examiner* — Michael Collins
(74) *Attorney, Agent, or Firm* — McDonnell Boehnen Hulbert & Berghoff LLP

(57) ABSTRACT

A method includes maintaining an inventory database for each warehouse of a plurality of warehouses, where a plurality of robots are deployed at each warehouse, where the inventory database for each warehouse is updated based on messages sent by the plurality of robots at the warehouse during performance of tasks by the plurality of robots at the warehouse. The method further includes receiving an order and determining, for each warehouse, a projected availability time for an item that satisfies the order to be available for pickup at the warehouse based on the inventory database for the warehouse. The method additionally includes selecting a warehouse from the plurality of warehouses based on the projected availability time determined for each warehouse. The method further includes causing at least one robot at the selected warehouse to prepare for pickup the item that satisfies the order at the selected warehouse.

20 Claims, 24 Drawing Sheets

(51) Int. Cl.
*G01C 21/34* (2006.01)
*B65G 67/04* (2006.01)
*G05D 1/02* (2020.01)

(52) U.S. Cl.
CPC ......... *G01C 21/3407* (2013.01); *G05D 1/021* (2013.01); *G06Q 10/08* (2013.01); *G06Q 10/083* (2013.01); *G06Q 10/087* (2013.01); *G06Q 10/0833* (2013.01); *G06Q 10/08355* (2013.01); *G05D 2201/0216* (2013.01)

(58) Field of Classification Search
CPC ............ G06Q 10/08355; G06Q 10/08; G06Q 10/0833; G01C 21/3407; G01C 21/343; G05D 1/021; G05D 2201/0216
USPC .......................................... 700/216, 231–244
See application file for complete search history.

(56) References Cited

U.S. PATENT DOCUMENTS

| | | | |
|---|---|---|---|
| 7,770,792 B2 | 8/2010 | Bruns et al. | |
| 8,075,238 B2 | 12/2011 | Wirz et al. | |
| 8,508,590 B2 * | 8/2013 | Laws | H04N 7/18 348/121 |
| 8,639,591 B1 | 1/2014 | Mishra et al. | |
| 8,892,241 B2 | 11/2014 | Weiss | |
| 8,965,562 B1 | 2/2015 | Wurman et al. | |
| 9,047,579 B2 | 6/2015 | Goh et al. | |
| 9,111,251 B1 | 8/2015 | Brazeau | |
| 9,120,622 B1 | 9/2015 | Elazary et al. | |
| 9,616,335 B2 | 4/2017 | Grissom et al. | |
| 10,022,867 B2 * | 7/2018 | Saboo | B25J 9/1674 |
| 10,296,995 B2 * | 5/2019 | Saboo | G06Q 50/28 |
| 2002/0143862 A1 | 10/2002 | Peterson | |
| 2004/0146380 A1 | 7/2004 | Baker et al. | |
| 2007/0276558 A1 | 11/2007 | Kim | |
| 2008/0077511 A1 | 3/2008 | Zimmerman | |
| 2008/0131255 A1 | 6/2008 | Hessler et al. | |
| 2009/0119010 A1 | 5/2009 | Moravec | |
| 2009/0180667 A1 | 7/2009 | Mahan et al. | |
| 2009/0198376 A1 | 8/2009 | Friedman et al. | |
| 2010/0121481 A1 | 5/2010 | Talley et al. | |
| 2011/0295411 A1 | 12/2011 | Rotella et al. | |
| 2012/0030070 A1 | 2/2012 | Keller et al. | |
| 2012/0166247 A1 | 6/2012 | Tu et al. | |
| 2012/0330458 A1 | 12/2012 | Weiss | |
| 2013/0173049 A1 | 7/2013 | Brunner et al. | |
| 2013/0317642 A1 | 11/2013 | Asada et al. | |
| 2014/0267703 A1 | 9/2014 | Taylor et al. | |
| 2014/0277691 A1 | 9/2014 | Jacobus et al. | |
| 2014/0278097 A1 | 9/2014 | Khorsheed et al. | |
| 2014/0350725 A1 | 11/2014 | LaFary et al. | |
| 2014/0354809 A1 | 12/2014 | Shondel | |
| 2015/0057793 A1 | 2/2015 | Kawano | |
| 2015/0073586 A1 | 3/2015 | Weiss | |
| 2015/0088302 A1 | 3/2015 | Mountz et al. | |
| 2015/0139766 A1 | 5/2015 | Cousins | |
| 2015/0332213 A1 | 11/2015 | Galluzzo et al. | |
| 2015/0360865 A1 | 12/2015 | Massey | |
| 2015/0363758 A1 | 12/2015 | Wu et al. | |
| 2015/0367513 A1 * | 12/2015 | Gettings | B25J 9/1664 700/248 |
| 2016/0042312 A1 | 2/2016 | Siebrecht et al. | |
| 2016/0129592 A1 * | 5/2016 | Saboo | G06Q 50/28 700/248 |
| 2017/0080566 A1 | 3/2017 | Stubbs et al. | |

OTHER PUBLICATIONS

Motorola White Paper, "The Synchronized Distribution Supply Chain: Best Practices in Warehouse Management," Motorola, Inc.; motorola.com/supplychainmobility, Mar. 2011.

* cited by examiner

ROBOT INVENTORY UPDATES FOR ORDER ROUTING

CROSS REFERENCE TO RELATED APPLICATION

The present application claims priority to U.S. Provisional patent application Ser. No. 62/551,181 filed on Aug. 28, 2017, the entire contents of which is incorporated herein by reference, as if fully set forth in this description.

BACKGROUND

One or more robots and/or other actors, such as human actors, human-driven vehicles, and autonomous vehicles, can operate throughout a supply chain. The supply chain can include various regions, such as buildings, roadways, flight routes, and seaways. Some of these regions are associated with one or more spaces, such as the interior of part or all of a building and/or its surrounding outdoor regions, where robots and/or the other actors perform tasks and/or otherwise utilize the space(s) together.

An example building in a supply chain is a warehouse, which may be used for storage of goods by a variety of different types of commercial entities, including manufacturers, wholesalers, and transport businesses. Example stored goods may include raw materials, parts or components, packing materials, and finished goods. The warehouse can be visited by various vehicles, such as human-driven and/or autonomous trucks, that load and unload goods at the warehouse. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

SUMMARY

In one aspect, a method is disclosed that includes maintaining an inventory database for each warehouse of a plurality of warehouses, wherein a plurality of robots are deployed at each warehouse, wherein the inventory database for each warehouse is updated based on messages sent by the plurality of robots at the warehouse during performance of tasks by the plurality of robots at the warehouse. The method further includes receiving an order. The method additionally includes determining, for each warehouse of the plurality of warehouses, a projected availability time for an item that satisfies the order to be available for pickup at the warehouse based on the inventory database for the warehouse. The method also includes selecting a warehouse from the plurality of warehouses based on the projected availability time determined for each warehouse of the plurality of warehouses. The method further includes causing at least one robot at the selected warehouse to prepare for pickup the item that satisfies the order at the selected warehouse.

In another aspect, a non-transitory computer readable medium is disclosed having stored therein instructions executable by one or more processors to cause the one or more processors to perform functions. The functions include maintaining an inventory database for each warehouse of a plurality of warehouses, wherein a plurality of robots are deployed at each warehouse, wherein the inventory database for each warehouse is updated based on messages sent by the plurality of robots at the warehouse during performance of tasks by the plurality of robots at the warehouse. The functions further include receiving an order. The functions additionally include determining, for each warehouse of the plurality of warehouses, a projected availability time for an item that satisfies the order to be available for pickup at the warehouse based on the inventory database for the warehouse. The functions also include selecting a warehouse from the plurality of warehouses based on the projected availability time determined for each warehouse of the plurality of warehouses. The functions further include causing at least one robot at the selected warehouse to prepare for pickup the item that satisfies the order at the selected warehouse.

In a further aspect, a system is disclosed that includes a plurality of robots deployed at each of a plurality of warehouses. The system further includes a control system configured to maintain an inventory database for each warehouse of the plurality of warehouses, wherein the inventory database for each warehouse is updated based on messages sent by the plurality of robots at the warehouse during performance of tasks by the plurality of robots at the warehouse. The control system is also configured to receive an order. The control system is additionally configured to determine, for each warehouse of the plurality of warehouses, a projected availability time for an item that satisfies the order to be available for pickup at the warehouse based on the inventory database for the warehouse. The system is further configured to select a warehouse from the plurality of warehouses based on the projected availability time determined for each warehouse of the plurality of warehouses. The system is additionally configured to cause at least one robot at the selected warehouse to prepare for pickup the item that satisfies the order at the selected warehouse.

In another aspect, a system is disclosed that includes means for maintaining an inventory database for each warehouse of a plurality of warehouses, wherein a plurality of robots are deployed at each warehouse, wherein the inventory database for each warehouse is updated based on messages sent by the plurality of robots at the warehouse during performance of tasks by the plurality of robots at the warehouse. The system further includes means for receiving an order. The system additionally includes means for determining, for each warehouse of the plurality of warehouses, a projected availability time for an item that satisfies the order to be available for pickup at the warehouse based on the inventory database for the warehouse. The system also includes means for selecting a warehouse from the plurality of warehouses based on the projected availability time determined for each warehouse of the plurality of warehouses. The system further includes means for causing at least one robot at the selected warehouse to prepare for pickup the item that satisfies the order at the selected warehouse.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Overview

Figure 1:
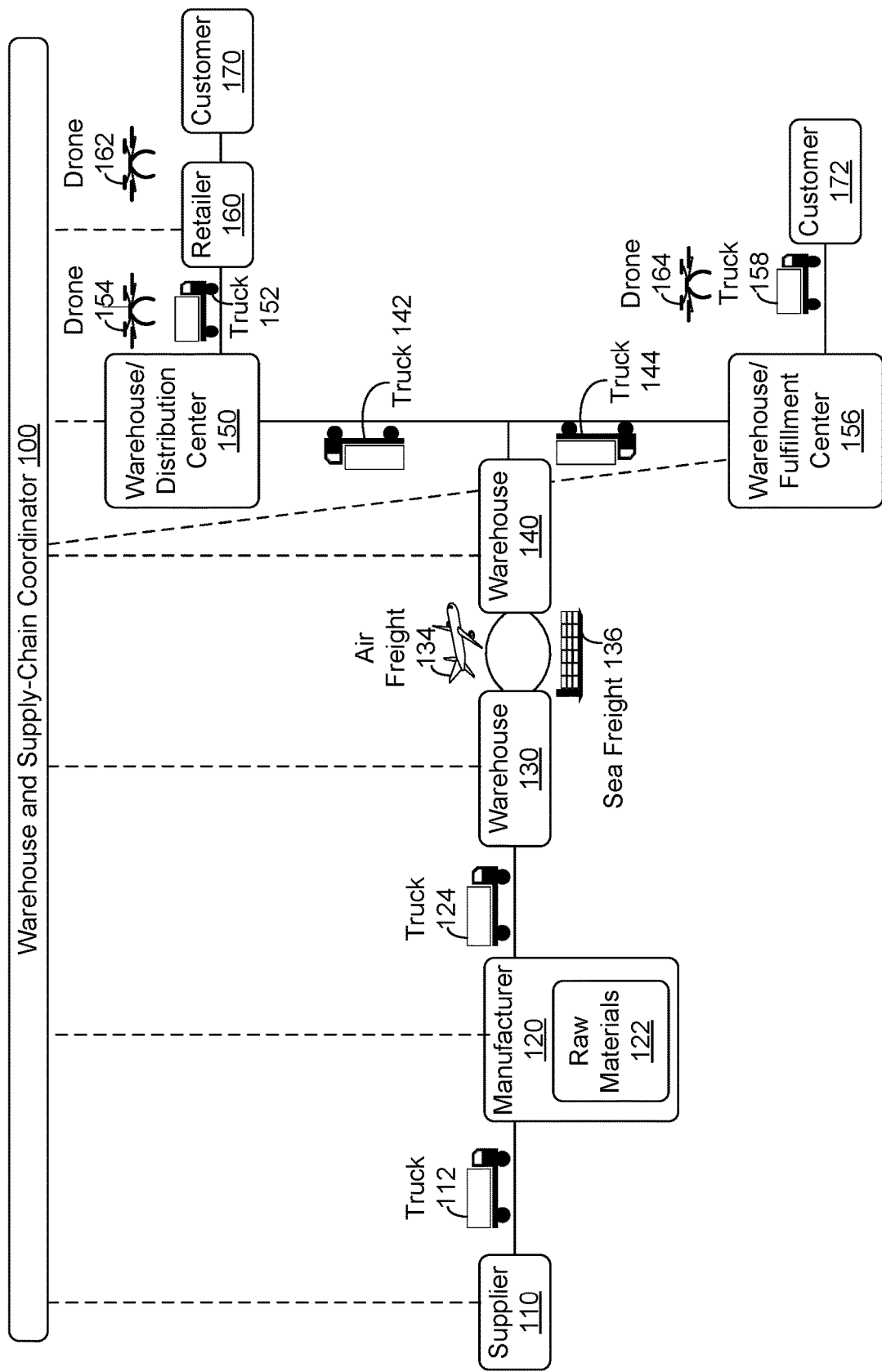
FIG. 1 is a diagram of a supply chain, in accordance with an example embodiment.

Robots may be deployed within a warehouse to perform automated tasks to facilitate management of inventory at the facility. By using robots in a warehouse, visibility into warehouse operation may be improved. In particular, data from the robots may allow for accurate inventory tracking as well as accurate projections of when inventory may be made available for pickup at the warehouse. Example systems may leverage this data from the robots for higher level optimizations.

When a customer places an order for a shipment of goods, an order management system (OMS) may be responsible for routing the order to a particular warehouse from a group of possible warehouses. To make the routing decision, the OMS may receive periodic communications from the warehouses to reconcile the current available inventory at the warehouses with a log stored by the OMS. However, in some situations, the OMS may not receive regular reconcilements from one or more of the warehouses. Consequently, situations may arise where a customer places an order, the OMS routes the order to a warehouse, and the OMS only learns that the warehouse does not have the needed inventory to satisfy the order when personnel at the warehouse attempt to fill the order. Such scenarios may lead to inefficiencies in order routing as a result of siloing of information between different facilities within a network.

Within examples, an inventory database may be maintained for each of a plurality of warehouses, where each warehouse has its own set of robots. The inventory database indicates available inventory at each warehouse. The inventory database is updated based on messages sent by robots during the performance of tasks by the robots at each warehouse. An OMS may use the inventory database to determine how to route an order between, e.g., one of three possible warehouses. The visibility into current warehouse state provided by robotic actors may improve the warehouse selection process for order routing.

In order to select a warehouse to receive an order, the OMS may use the inventory database to determine a projected availability time by which an item that satisfies the order will be available for pickup at each of the warehouses. The projected availability time is a clock time or window of time at which the item is expected to be available for pickup at the warehouse (e.g., by a delivery vehicle). In further examples, the projected availability time is a time at which one or more mobile robots at the warehouse are expected to have moved the item to a loading dock at the warehouse. In some examples, the warehouse with the earliest projected availability time for an ordered item may be selected from a plurality of warehouses to receive an order.

In further examples, the inventory database for each warehouse may be updated based on scans of arriving inventory and departing inventory performed at a loading dock by the robots at the warehouse. For example, a mobile robot may be configured to scan each arriving item for a barcode or other on-item identifier after unloading the item from a delivery vehicle. Information identifying the item may be communicated in real-time or near real-time to the OMS, either directly by the robot itself or relayed by a warehouse management system (WMS) of the warehouse in order to update the inventory database. By using sensor data from the robots to reconcile inventory changes, the error bars around currently available inventory at each warehouse in a network may be made much smaller than at manually operated warehouses.

In further examples, the inventory database for each warehouse may include the locations of inventory items within the warehouse. The locations of inventory items at a warehouse may be used to determine the projected availability time for the warehouse. In particular, the fulfillment time for an order may depend on where in a given warehouse the inventory that satisfies the order is currently located. In order to update inventory location information in the inventory database, individual robots or the WMS at each warehouse may be configured to notify the OMS each time an item or pallet has been relocated from one location in the warehouse to another location. In further examples, the locations of inventory items within a warehouse may be updated in response to detections of on-item identifiers (e.g., barcodes) on the inventory items by sensors on the robots in the warehouse. Such detections and database updates may leverage sensor data collected by the robots while performing other operations in the warehouse.

In additional examples, the inventory database for each warehouse may include metrology information for inventory items within the warehouse. The metrology information may also be used to help determine projected availability times for inventory items that will satisfy received orders. Example metrics that may be stored in the inventory database include size, shape, dimensions, weight, and center of mass. In some examples, the metrics may be provided to an OMS based on sensor data from sensors on robots at each warehouse. For instance, when a robot scans incoming inventory, metrology information may be associated with on-item identifiers and provided to the OMS to update the inventory database.

In order to determine the projected availability time for an item that satisfies the order to be available for pickup at a warehouse, scheduling information for robots at the warehouse may be considered. The scheduling information includes future tasks scheduled to be performed by robots at the warehouse. Such tasks may include repositioning inventory at the facility, unloading cargo from a delivery truck, and loading cargo onto a delivery truck, as well as other operations. In some examples, the scheduling information may include a separate ordered queue of tasks currently assigned to each robot at the warehouse. For instance, based on the queue of tasks assigned to a particular robot and the current location of inventory at the warehouse, an OMS may be able to predict that inventory can be transported to a loading dock at a warehouse in time to reach an overnight plane leaving in one hour. This prediction may be made by the OMS before routing the order to the warehouse.

In further examples, the projected availability time may be determined by running a software simulation that takes into account a position of the inventory in the warehouse. The simulation also may take into account future assigned tasks for individual robots and/or the entire group of robots at the warehouse. By using a software simulation, an accurate prediction of inventory availability time may be generated given the current state of the warehouse without changing any robot operations until a decision to route an order to a particular warehouse is made. Robot position information and/or robot scheduling information for a warehouse may also be stored in the inventory database or a different database accessible by an order routing system.

In additional examples, an OMS may additionally consider a projected arrival time by which a delivery vehicle (e.g., a delivery truck) from a fleet of delivery vehicles can reach each warehouse to pick up the ordered item before selecting a warehouse to receive the order. In some examples, the projected arrival time for a warehouse may be determined so that the projected arrival time is after the projected availability time for the ordered item at the warehouse to minimize wait time for the delivery vehicle. The projected arrival time may be determined using real-time mapping data. In some examples, mapping software may be used that takes into account one or more constraints (e.g., height, weight) of the delivery vehicle. In some examples, different projected arrival times for delivery vehicles at two warehouses may cause the OMS to not route an order to the warehouse with the earliest projected availability time.

In further examples, a projected load time may be determined for each warehouse. The projected load time for a warehouse is a time by which one or more robots at the warehouse are expected to have loaded the cargo onto a delivery vehicle at the warehouse. The projected load time may also be used by an OMS to select a warehouse to receive an order. The projected load time may be based in part on robot-collected metrics of the ordered item (e.g., dimensions, weight). Metrology information may also be used to ensure that a delivery vehicle will have adequate free space to accommodate the item before routing the order to the warehouse. The projected load time may also be based on a number of robots expected to be assigned to load the cargo onto the delivery vehicle. This number of robots may be determined based on current scheduling information for the robots at the warehouse.

In further examples, a warehouse may be selected even though an ordered item is not at the warehouse when the order is received. The projected availability time for such a warehouse may be determined based on when the item is expected to arrive at the warehouse and to be processed by one or more robots to be made ready for pickup. In such examples, a projected arrival time for the item that would satisfy the order to reach the warehouse may be determined. For instance, the projected arrival time may be a time at which a delivery vehicle is expected to reach the warehouse with the item based on a scheduled route for the delivery vehicle. The projected availability time may then be determined to be a time after the projected arrival time by which one or more robots at the warehouse will have the item ready for pickup. This determination may take into account robot scheduling information to predict when one or more robots will be available to complete tasks (e.g., unloading cargo from the delivery vehicle, locating the item, moving the item to another loading dock for pickup) needed to prepare the item for pickup.

In additional examples, an ordered item to be provided by a selected warehouse may first be delivered by a delivery vehicle to the selected warehouse from a separate warehouse. In such examples, scheduling information for a separate plurality of robots at the separate warehouse may also be used to determine the projected availability time. For instance, an order routing system may consider both expected robot time needed to load the item onto a delivery vehicle at one warehouse and expected robot time needed to unload the item at another warehouse before preparing the item for pickup. More generally, an order routing system with near real-time visibility into robot positions and inventory positions at a number of different warehouses may leverage such information to trigger order routing between automated facilities.

In some examples, an order routing system may have different levels of visibility into separate warehouses. For instance, a first warehouse may be fully automated with a WMS fully integrated with the order routing system, a second warehouse may have a WMS that is not in communication with the order routing system, and a third warehouse may be a semi-automated warehouse with both robotic actors and human actors. However, robots that are in communication with the order routing system may be deployed in each of the three warehouses. The robots allow for the creation of a mirrored database with the positions of all inventory at each of the three warehouses even without direct integration with the WMS at each warehouse. A single system that receives robot inventory updates across a network of warehouses and also controls the order pipeline between warehouses has improved visibility to route orders.

In additional examples, the order routing system may consider the different levels of visibility when routing orders. For instance, the system may be integrated with the WMS at a first warehouse, and thus may have access to near real-time inventory information as well as robot scheduling information at the first warehouse. In contrast, the system may only have access to inventory information at a second warehouse, but not robot scheduling information. In some examples, the system may associate a confidence level with the projected availability time determined for each warehouse based on the amount of information available. For instance, in this example, the system may associate a higher confidence level in the projected availability time for the first warehouse than the second warehouse, and choose to route an order to the first warehouse. Confidence scores may also be based on other types of information as well or instead, such as knowledge of physical locations of inventory in each warehouse and/or knowledge of metrology information for inventory in each warehouse.

In further examples, an order routing system may also use projected inventory availability times to trigger adjustments to the number of robots at one or more warehouses. For instance, if the order routing system receives an order and determines that no available warehouse in the system has a projected availability time that allows the order to be satisfied by the deadline, the order routing system may relocate one or more robots to help clear a bottleneck at a particular warehouse. In some examples, robots may be relocated from other warehouses or from other dispatch locations using available free space on delivery vehicles.

More generally, an order routing system may forecast order peaks and thus add robots to particular warehouses to improve delivery times. In some examples, such robots could be licensed to customers for a short period of time (e.g., a couple of months), and could help the overall supply chain meet order deadlines. Improved visibility into a number of different warehouses may allow a control system to strategically allocate a fleet of temporary robots that individual warehouses could rent for system-suggested periods of time depending on projected peak times.

Coordinated Logistics and Warehouse Manager

Example embodiments involve a warehouse and supply-chain coordinator. The warehouse and supply-chain coordinator can coordinate and optimize various elements in one or more supply chains. The warehouse and supply-chain coordinator can receive data from multiple data sources and computer systems, such as, but not limited to: warehouse management systems (WMSs) operating in different warehouses, transportation systems, including freight brokering systems and/or in-vehicle monitoring systems for real-time estimated time of arrival (ETA) estimates, and demand forecasting systems. Some or all of the herein-described functionality of the warehouse and supply-chain coordinator can be implemented using software executing one or more (networked) computing devices; e.g., the warehouse and supply-chain coordinator can be software executing in the "cloud".

The warehouse and supply-chain coordinator can provide services including, but not limited to: warehouse control services; robotic control services for controlling robots in a warehouse and/or autonomous delivery vehicles; services for coordinating replenishment of inventory from multiple supply chain levels; services for coordinating freight and shipping transactions, including combining partial vehicle loads, increasing vehicle utilization, and decreasing empty miles driven; and services for rationalizing shipping networks. In some examples, the warehouse and supply-chain coordinator is used to control one supply chain; e.g., a supply chain for one company or other enterprise. In other examples, the warehouse and supply-chain coordinator is part of a marketplace and/or ecosystem where service providers for warehousing, freight transportation, etc. are matched with demands for services.

Example warehouse control services include, but are not limited to: yard management services for vehicle arrivals to the warehouse, such as routing trucks and/or other vehicles to appropriate loading docks, staging locations, and/or parking locations; services related to coordinating robots and/or other agents with vehicle arrivals at (a loading dock of) the warehouse based upon vehicle traceability and real-time ETA for maximizing warehouse throughput; services related to controlling robots within the warehouse to move inventory; services for automatic virtual receipt of goods based upon knowledge of vehicle contents and successful robotic unloading; services for "slotting" or locating inventory within the warehouse (e.g., locating inventory based on projected and/or actual stock keeping unit (SKU) velocity); services for "re-slotting" or relocating inventory within the warehouse (e.g., based upon changes in projected and/or actual SKU velocity and/or available warehouse space); services for reallocating inventory between customer orders based upon priority or required shipping time; and services for automatic virtual shipment of goods based upon knowledge of vehicle contents and successful robotic loading.

In this document, unless otherwise explicitly stated, the term "pallet" represents a container of one or more goods that can be brought to, stored at, and/or obtained from a warehouse; e.g, a pallet can include one or more: pallets, boxes, bags, bales, cartons, crates, packages, parcels, and/or other containers (or other objects) associated with goods that can be brought to, stored at, and/or obtained from a warehouse.

For example, the warehouse and supply-chain coordinator can estimate times of arrival and departure for vehicles arriving at and departing from a warehouse or other location. The warehouse and supply-chain coordinator can determine a pallet arrangement based on arrival and/or departure times. For example, a pallet arrangement associated with a loading dock can include a first pallet associated with a first vehicle and a second pallet associated with a second vehicle.

If the first vehicle is scheduled to arrive at the loading dock before the second vehicle, then the first pallet can be located closer to the loading dock than the second pallet, so to shorten a distance between a location of the first pallet and a location of the first vehicle at the loading dock, and thus reduce loading time of the first vehicle. However, if the estimated time of arrival changes so that the first vehicle is now estimated to arrive after the second vehicle, the warehouse and supply-chain coordinator can responsively order one or more robots to modify the pallet arrangement so that the second pallet is closer to the loading dock than the first pallet, and thus reduce loading time of the second vehicle. Example arrangements of pallets (and/or other objects) can include, but are not limited to, one or more of: a line of pallets (and/or other objects), a regular or irregular grid of pallets (and/or other objects), a stack of pallets (and/or other objects), a cube of pallets (and/or other objects), a pyramid of pallets (and/or other objects), and/or other arrangements of pallets (and/or other objects).

As another example, the warehouse and supply-chain coordinator can manage resources associated with the warehouse, such as loading dock time slots, parking locations, storage spaces (e.g., spaces for storing pallets), warehouse access, and robots at the warehouse. Resources can be managed by reserving or allocating a resource for one or more vehicles, robots, and/or other entities, releasing or deallocating a resource from one or more vehicles, robots, and/or other entities, switching reservations between vehicles, robots, and/or other entities, providing information about managed resources (e.g., a schedule of allocated time slots, data indicating whether a particular parking spot is available at a particular time, information about a location of a robot).

In some cases, resources can be allocated based on estimated and/or actual arrival times; e.g., access to a warehouse can be granted to a vehicle when the vehicle actually arrives at the warehouse, a time slot at a loading dock can be reserved for a vehicle scheduled to arrive at the warehouse during the time slot, and/or a robot can be directed to arrive at a loading dock at or about the same time that a vehicle arrives at the loading dock. Then, when an estimated arrival time (or departure time) changes, the warehouse and supply-chain coordinator can: (1) release an original time slot at a loading dock and/or parking spot from a vehicle scheduled to arrive at the changed arrival time (or departure time); (2) reserve the original time slot at the loading dock and/or parking spot for a vehicle scheduled to arrive (or depart) before the changed arrival time (or departure time), (3) reserve a new time slot at the loading dock and/or parking spot for the vehicle scheduled to arrive (or depart) at the changed arrival time (or departure time), and (4) schedule one or more robots to be at the loading dock at or before the beginning of the original time slot and/or the new time slot. The original and/or new time slot and/or parking spot can be based on the changed arrival time (or departure time); e.g., a reserved time slot includes/starts at an estimated arrival time, a reserved time slot ends at before an estimated departure time, and/or a parking spot is reserved from an estimated arrival time to a beginning of a time slot, etc.

Also, other resources, such as warehouse access and robot allocation, can be based on an arrival time or departure; e.g., a warehouse gate can be opened to enable access to a vehicle at an arrival time and/or a departure time, robots can be scheduled to be at a loading dock when a vehicle arrives and/or until a vehicle departs, space in a warehouse can be made available for pallets scheduled to be unloaded from a vehicle arriving at an ETA, pallets can be moved toward and/or to a loading dock at an estimated arrival time to be loaded onto a vehicle arriving at the estimated arrival time. More specifically, robots can be assigned to tasks that are based on an arrival time or departure. These tasks can include picking up one or more pallets and taking the pallet(s) to a loading dock at least X minutes before a truck arrives at the loading dock, where X is an estimated number of minutes required to take the pallet(s) from their location(s) in the warehouse to the loading dock. These tasks can be scheduled based on the truck's estimated time of arrival so that congestion at the loading dock is reduced or eliminated to reduce or eliminate delay in delivering the pallet(s) from the warehouse to the truck.

The warehouse and supply-chain coordinator can direct robots to perform various tasks in and around the warehouse, such as, but not limited to: loading a vehicle, unloading a vehicle, pick-and-place operations where a robot gets (or "picks") one or more items, such as pallets, from one location and takes (or "places") the item(s) to a second location, inspecting goods, and swapping item(s) between locations.

To inspect goods, the robot can examine a pallet of goods; e.g., a pallet arriving on a vehicle and/or a pallet already stored in the warehouse, to determine if goods of the pallet are in compliance with a contract. For example, suppose a contract states that a pallet of goods that includes 100 mobile devices is to be shipped on truck T1 to a warehouse W1 where robot R1 is located. In this example, suppose truck T1 only includes one pallet P1 to be unloaded at warehouse W1. Then, upon arrival of truck T1, the robot R1 can examine pallet P1 carried by truck T1, perhaps before P1 is unloaded from truck T1 into warehouse W1, to determine whether pallet P1 actually includes 100 mobile devices. If robot R1 determines that pallet P1 includes 100 mobile devices then robot R1 can inform the warehouse and supply-chain coordinator that inspection of pallet P1 succeeded, and the warehouse and supply-chain coordinator can both (a) generate a receipt for pallet P1 and (b) direct robot R1 and/or one or more other robots to unload pallet P1 from truck T1 into warehouse W1. Otherwise, if robot R1 determines that pallet P1 does not include 100 mobile devices, then robot R1 can inform the warehouse and supply-chain coordinator that inspection of pallet P1 failed, and the warehouse and supply-chain coordinator can reject delivery of pallet P1 and direct robot R1 and/or one or more other robots to leave pallet P1 on truck T1 as rejected goods. In some cases, rejecting delivery of a pallet of goods includes sending a rejection notice to a supplier of the pallet of goods informing the supplier that the pallet was rejected. Many other examples of inspecting and/or rejecting goods are possible as well.

In some examples, the warehouse and supply-chain coordinator can coordinate additional aspects of a supply chain beyond warehouses. For examples, the warehouse and supply-chain coordinator can determine one or more orders requesting production, storage, and/or delivery of one or more pallets of goods using a supply chain that includes the warehouse and supply-chain coordinator. The supply chain can also include locations, such as supplier locations, warehouses, and retail locations, connected by a plurality of paths such as roads, water shipping routes, and/or airways, where at least one pallet is conveyed from a first location to the second location using a vehicle traveling on a path from the first location to a second location, where at least one of the first location and the second location includes a warehouse capable of storing the at least one pallet, and where the vehicle includes an autonomous vehicle configured to be controlled by the warehouse and supply-chain coordinator. Then, the warehouse and supply-chain coordinator can determine whether an event occurs that is related to the at least one pallet. The event can include, but is not limited to one or more of: an event related to goods of the at least one pallet, an event related to the first and/or second locations, an event related to the autonomous vehicle, a weather-related event, a seasonally-related event, an event related to search queries and/or results, an event related to advertising and/or social media, and other types of events. In some cases, the event includes an event where a location does not store at least a quantity of an item; e.g., the location is running relatively-low and/or has run out of the item.

After determining that the event is related to the at least one pallet, the warehouse and supply-chain coordinator can change the path of the vehicle to a third location in the supply chain. As one specific example, suppose the pallet of goods includes bottled water, and the warehouse and supply-chain coordinator determines that an event E1 occurs where a hurricane or other storm is predicted to reach the third location (thus increasing a demand for the bottled water at the third location) but not reach the second location. Then, the warehouse and supply-chain coordinator can change the path of the vehicle with the pallet having bottled water to the third location. As another specific example, suppose the pallet of goods includes football jerseys and the warehouse and supply-chain coordinator determines that an event E2 occurs where a location of a scheduled football game is moved from the second location to the third location. Then, the warehouse and supply-chain coordinator can change the path of the vehicle with the pallet having the football jerseys to the third location. As a third specific example, suppose that the pallet of goods includes an item I, and the warehouse and supply-chain coordinator determines that an event E3 occurs where search queries and/or results including references to item I with respect to the third location are greatly increased, but search queries and/or results including references to item I associated with the second location are not increased. Then, the warehouse and supply-chain coordinator can change the path of the vehicle with the pallet having the item I to the third location. Many other examples are possible as well.

Some or all locations in the supply chain can have priorities, which can change based on events. Continuing the bottled-water example above, suppose that the priority of the second location before E1 is P2_BEFORE and the priority of the third location before E1 is P3_BEFORE, where P2_BEFORE is higher than P3_BEFORE since the second location is the destination for the pallet of goods having the bottled water. Then, upon determining the E1 has occurred, the warehouse and supply-chain coordinator can recalculate or otherwise determine the priority of the third location to be P3_AFTER, where P3_AFTER is a higher priority than P2_BEFORE. Then, since P3_AFTER is a higher priority than P2_BEFORE, the warehouse and supply-chain coordinator can change the path of the vehicle with the pallet having the bottled water to the third location.

In some cases, the warehouse and supply-chain coordinator can trigger new orders and/or replenishment of supplies based on existing orders and/or changed orders. For example, suppose the warehouse and supply-chain determines that an order O1 orders a quantity Q1 of goods G1 to be carried from a location L1 to a location L2. Then, the warehouse and supply-chain can route and/or otherwise assign a vehicle V1 to pick up at least the quantity Q1 of goods G1 from location L1 and carry the quantity Q1 of goods G1 to location L2. In this example, after routing vehicle V1 to pick up the quantity Q1 of goods G1 at location L1, the warehouse and supply-chain coordinator determines that location L1 does not have the quantity Q1 of goods G1, but another location L3 has at least the quantity Q1 of goods G1. Then, the warehouse and supply-chain coordinator can reroute and/or otherwise reassign vehicle V1 to pick up at least the quantity Q1 of goods G1 from location L3.

The warehouse and supply-chain coordinator can replenish quantities of goods by ordering items from a supplier. Continuing the example above, after the warehouse and supply-chain coordinator determines that location L1 does not have the quantity Q1 of goods G1, the warehouse and supply-chain coordinator can generate and send an order O1 to supplier S1 for a quantity Q2 of goods G1. Upon reception of order O1, supplier S1 can send a response R1 to the warehouse and supply-chain coordinator indicating that order O1 is fulfilled and awaiting shipment. Upon sending order O1, upon receiving response R1, or at some other time, the warehouse and supply-chain coordinator can generate and send an order O2 to vehicle V2 to pick up the quantity Q2 of goods G1 from supplier S1. In some examples, order O2 also directs vehicle V2 to take at least some of the quantity Q2 of goods G1 from supplier S1 to location L1, which did not have a quantity Q1 of goods G1. In other examples, order O2 also directs vehicle V2 to take at least some of the quantity Q2 of goods (ii from supplier S1 to another location L3. In still other examples, order O2 also directs vehicle V2 to take at least some of the quantity Q2 of goods G1 from supplier S1 to location L1 via a waypoint location WL1; e.g., to pick up goods at WL1 and/or to deliver goods to WL1. When vehicle V2 arrives at waypoint location WL1 (or location L1), the warehouse and supply-chain coordinator can receive information I1 that vehicle V2 has arrived at waypoint location WL1 (or location L1) or that vehicle V2 is scheduled to arrive at waypoint location WL1 (or location L1). Upon receiving information I1, the warehouse and supply-chain coordinator can generate and send order O3 to one or more robots at waypoint location WL1 (or location L1) to load and/or unload vehicle V2. After the robot(s) have loaded and/or unloaded vehicle V2, vehicle V2 can leave waypoint location WL1 (or location L1) and continue on to another location. Many other examples of routing vehicles, re-routing vehicles, orders, replenishment, and/or other operations related to warehouses and/or supply chains are possible as well.

The warehouse and supply-chain coordinator can provide services and/or applications related to transportation network rationalization. In some examples, the warehouse and supply-chain coordinator determines movement of goods, reviews possible shipping and warehousing permutations, and generates recommendations for transport network solutions. Such solutions can include, but are not limited to, solutions involving: consolidation of partial vehicle shipments to improve vehicle utilization/decrease empty miles driven, passing of freight between warehouses to increase vehicle and/or warehouse utilization; relocation of warehouses and inventory placement to more economically utilize transportation routes and establish more efficient shipping networks, and in some cases, leverage inventory, warehouses, and vehicles owned by multiple parties.

The warehouse and supply-chain coordinator can coordinate groups of robots efficiently to optimize the loading and unloading of vehicles at a facility, such as a loading dock of a warehouse. In particular, the warehouse and supply-chain coordinator can precisely time the arrival of a pallet at the front of the loading dock when a truck arrives and economically utilize the space at the loading dock; e.g., as a queue of pallets. By planning/coordinating future robot actions the warehouse and supply-chain coordinator can precisely determine where a pallet destined for shipment is located, that is, when the pallet destined for shipment will arrive in the queue, when the pallet destined for shipment will be slotted in the front of the queue for immediate shipment, etc. Designating one or more robots to move pallets in the queue of pallets to save a few minutes for an incoming vehicle may be more feasible than assigning human workers/drivers to move these pallets with a fork truck. Also, some robots are smaller than a standard forklift and so can more easily fit in tight spaces at the loading dock. Further, the use of two or more robots directed and coordinated by the warehouse and supply-chain coordinator can also more easily reorder the queue, both by reducing the number of operations used in queue reordering and by receiving navigation instructions from a single control system as opposed to two autonomous agents trying to coordinate their actions in the confines of a loading dock.

In some examples, instructions and/or messages communicated between the warehouse and supply-chain coordinator and robots are communicated between the warehouse and supply-chain coordinator and other agents than robots, such as, but not limited to, human agents, material handling systems operated and/or managed by humans, and human-assisted robotic devices. Examples of material handling systems include, but are not limited to, electrical systems, mechanical systems, and electro-mechanical systems, such as automated pallet wrapping machines, powered doors, etc.

In other examples, the warehouse and supply-chain coordinator operates using a work plan. In these examples, pallets can be physically placed at or near a loading dock as directed by an expected pallet movement schedule of the work plan. Then, when the warehouse and supply-chain coordinator receives data that truck arrival times and/or estimated times of arrival have changed the warehouse and supply-chain coordinator can update the work plan in accord with the changed truck arrival times/estimated times of arrival. In these examples, the warehouse and supply-chain coordinator changes the work plan based on changes in truck arrival times/estimated times of arrival, rather than typical workflows that schedule work within the warehouse based on scheduled appointments for the arriving trucks.

The use of the warehouse and supply-chain coordinator can make supply chains more flexible, and thus more efficient. Other efficiencies can be gained by coordinating warehouse activities with arriving and departing trucks—time can be saved when the warehouse and supply-chain coordinator arranges for robots to be waiting for incoming trucks and arranges for pallets of goods destined for an outgoing truck to be near its loading dock. Fuel and time expended by trucks waiting for loading docks and goods at warehouses can be saved as well. The warehouse and supply-chain coordinator can provide better visibility into the supply chain. By making supply chains more efficient and flexible, the warehouse and supply-chain coordinator can enable consolidation of shipments, routes, vehicles, warehouses, and suppliers.

Example Warehouse and Supply-Chain Coordinator and Supply Chains

FIG. 1 is a diagram of a supply chain, in accordance with an example embodiment. The supply chain includes warehouse and supply-chain coordinator 100, supplier 110, manufacturer 120, warehouses 130, 140, warehouse/distribution center 150, warehouse/fulfillment center 156, retailer 160, and customers 170, 172. These entities are connected by routes traversed by various vehicles, including trucks 112, 124, 142, 144, 152, 158, air freight 134, sea freight 136, and drones 154, 162. In the supply chain shown in FIG. 1, a route between supplier 110 and manufacturer 120 is traversed by truck 112, a route between manufacturer 120 and warehouse 130 is traversed by truck 124, and routes between warehouse 130 and warehouse 140 are traversed by air freight 134 and sea freight 136.

As indicated by dashed lines in FIG. 1, warehouse and supply-chain coordinator 100 can communicate with supplier 110, manufacturer 120, warehouses 130, 140, warehouse/distribution center 150, warehouse/fulfillment center 152, and retailer 160. In some examples, warehouse and supply-chain coordinator 100 can communicate with additional entities; e.g., some or all of trucks 112, 124, 142, 144, 152, 158, air freight 134, sea freight 136, customers 170, 172, and/or additional entities related to one or more supply chains; e.g., one or more robots and/or other agents working in a warehouse, at a supplier, at a manufacturer, etc.

Also in the supply chain shown in FIG. 1, a route between warehouse 140 and warehouse/distribution center 150 is traversed by truck 142, a route between warehouse 140 and warehouse/fulfillment center 156 is traversed by truck 144, routes between warehouse/distribution center 150 and retailer 160 are traversed by truck 152 and drone 154; i.e., an autonomous aerial vehicle acting as drone 154, a route between retailer 160 and customer 170 is traversed by drone 162, and a route between warehouse/fulfillment center 156 and customer 172 is traversed by truck 158. In other examples, more, fewer, and/or different routes and vehicles traversing routes are possible in a supply chain. In still other examples, more, fewer, and/or other locations in a supply chain are utilized; e.g., there are more and/or different suppliers, there are more and/or different manufacturers, there are more, fewer, and/or different warehouses, etc. In even other examples, drones, such as drones, 154, 162, and 164 are utilized to cover a "last mile" from a warehouse; e.g., a drone is used to deliver goods on routes from warehouses, such as warehouse 140, warehouse/distribution center 150, and/or warehouse/fulfillment center 156, to customers, such as customers 170, 172. In particular, FIG. 1 shows drone 164 delivering goods from warehouse/fulfillment center 156 to customer 172.

In the supply chain shown in FIG. 1, a supplier location provides components used by a manufacturer location to make and/or otherwise prepare one or more goods or shipment. In some examples, a manufacturer location and/or a supplier location store raw materials used to make components and/or goods, such as raw materials 122 stored at manufacturer 120.

A supply chain can have one or more owners. For example, supplier 110 can be owned by a first company, manufacturer 120 can be owned by a second company, warehouses 130 and 140 can be owned by a third company, etc. Also, vehicles in the supply chain may be owned by different entities than own buildings in the supply chain, where buildings are depicted in FIG. 1 using rounded rectangles; e.g., customers 170, 172 can be in buildings such as homes or business related buildings such as offices, factories, and/or other kinds of business-related buildings; some or all of supplier 110, manufacturer 120, and warehouses 130, 140 can include one or more buildings, etc.

A supply chain can be managed by one or more entities, which may or may not own any buildings or vehicles in the supply chain. For example, a warehouse management company can operate warehouse 130 for the owner of warehouse 130; in other examples, the owner of warehouse 130 can manage/operate the warehouse.

Various data can be used to operate the supply chain. For example, data on a per-SKU basis can be maintained; e.g., a quantity of an item represented by a SKU at a particular location in the supply chain, data on SKU velocity, one or more costs, prices, weights, sizes, dimensions, sources, and/or destinations of items represented by a SKU, etc. Data about buildings, locations, and/or vehicles in the supply chain can be maintained; e.g., one or more locations, costs, prices, weights, sizes, dimensions, sources, and/or destinations of buildings and/or vehicles in the supply chain; data about a route One or more computing devices executing software can be utilized as warehouse and supply-chain coordinator 100. For example, the or more computing devices acting as warehouse and supply-chain coordinator 100 can be utilized as a cloud and/or network-based solution. The warehouse and supply-chain coordinator 100 can include and/or communicate with a warehouse management system (WMS) used to control operations within one or more warehouses and/or to provide information about items/entities that are "upstream" (or logically closer to a supplier location. In the supply chain, such as supplier 110) and/or items/entities that are downstream (or logically closer to a customer location, such as customer 170 or 172).

Warehouse and supply-chain coordinator 100 can provide user interfaces enabling review, creation, updating, and deletion of data used to operate the supply chain and can send and receive messages to control various entities, such as, but not limited to, robots, vehicles, and access control systems such as gates providing ingress and/or egress to a building or other locations. Warehouse and supply-chain coordinator 100 also can control various resources used in operating a warehouse and/or a supply-chain, such as access to a facility, time slots for loading/unloading vehicles, storage locations or "slots", parking spots, cargo capacity of a vehicle. Warehouse and supply-chain coordinator 100 can provide visibility and control of goods moving through the supply chain; e.g, visibility about goods that are upstream and/or downstream of one or more points in the supply chain (e.g., upstream and/or downstream of one or more selected warehouses, suppliers, retailers, and/or customers). This visibility can be provided by tracking shipments of goods through the supply chain and extracting information from these goods at a SKU level, enabling visibility of specific goods within the supply chain; e.g., warehouse and supply-chain coordinator 100 can provide information about locations of goods having one or more given SKUs, locations of shipments carrying goods having one or more given SKUs, pending, in-progress, and/or fulfilled orders of goods having one or more given SKUs from one or more suppliers, etc.

While managing and coordinating shipments through the supply chain, warehouse and supply-chain coordinator 100 can communicate with various transportation modes, such as air, sea, and land-based modes of transportation. Warehouse and supply-chain coordinator 100 can combine loads from multiple warehouses into one shipment and consolidate loads from multiple shipments for storage at one warehouse. Warehouse and supply-chain coordinator 100 can account for various constraints at a given warehouse, such as a number of loading docks, space for loading and/or unloading goods, total amount of available storage, types of storage facilities (e.g., refrigerated storage, climate-controlled storage, storage for liquid and/or gaseous goods), labor and/or robot availability, to reduce and/or avoid inefficiencies at a warehouse. Warehouse and supply-chain coordinator 100 can stage goods for outgoing orders at a loading dock to increase efficiencies of loading goods onto trucks, ships, rail cars, planes, drones, and/or other vehicles; e.g., stage goods in a pallet arrangement that ensure pallets destined for a truck at a loading dock are closest to the loading dock. Warehouse and supply-chain coordinator 100 can also manage storage locations within a warehouse to enable efficient unloading of vehicles at loading docks; e.g., allocate storage close to a loading dock for an incoming vehicle to the incoming vehicle, so that goods can be rapidly unloaded from the incoming vehicle to the allocated storage.

Scenarios 200, 300, 400, 500, and 600 reflect various applications of a flexible supply chain utilizing warehouse and supply-chain coordinator 100, such as the supply chain shown in FIG. 1 discussed above, and in FIGS. 2, 3, 4, 5, and 6 discussed below.

Figure 2:
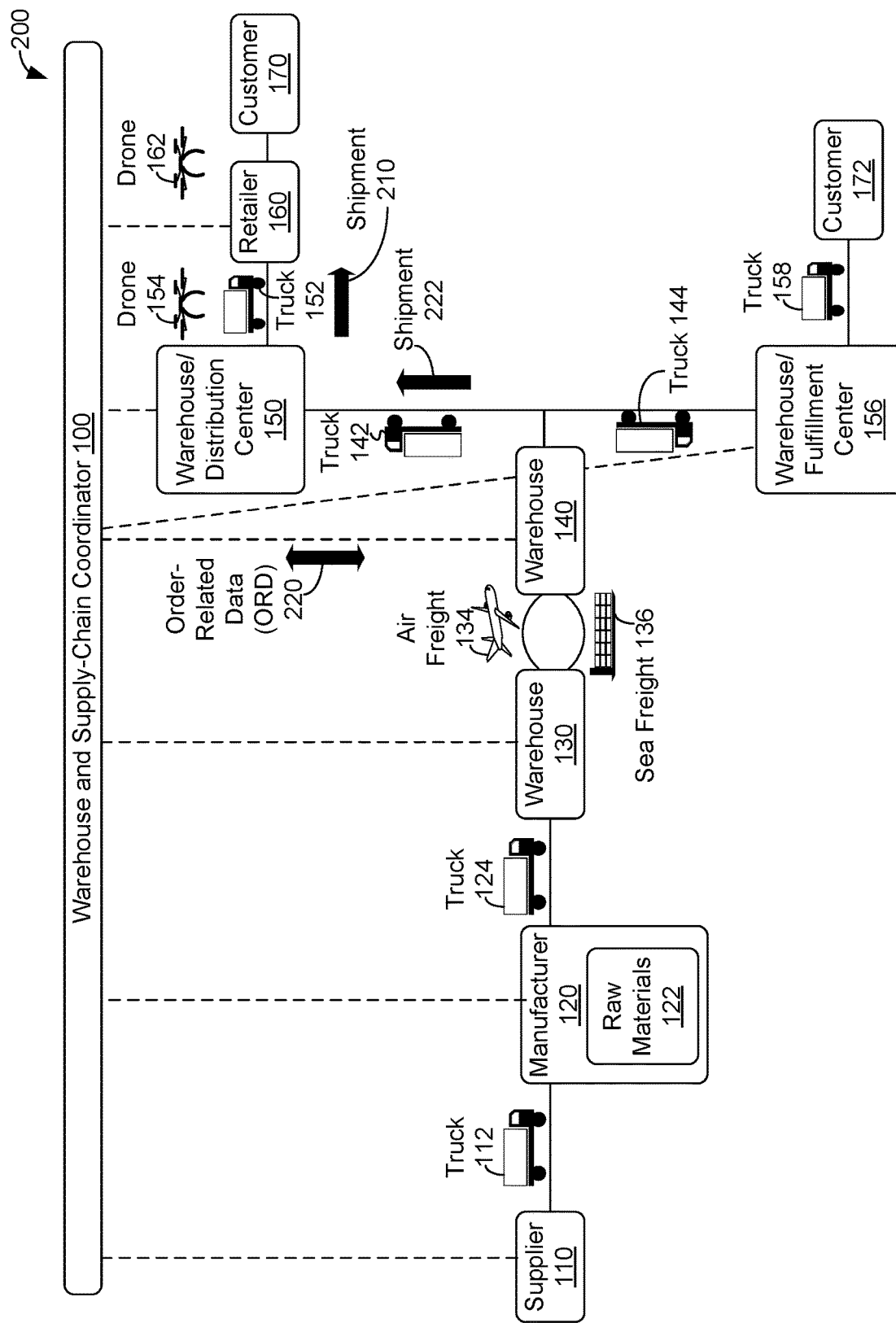
FIG. 2 illustrates a scenario where order-related data triggers a shipment to a retailer, in accordance with an example embodiment.

FIG. 2 illustrates scenario 200 where order-related data (ORD) 220 triggers shipment 222 to retailer 160, in accordance with an example embodiment. Scenario 200 involves shipment 210 of goods G200 from warehouse/distribution center 150 to retailer 160 via truck 152. After shipment 210, order-related data 220 is communicated between warehouse 140 and supply-chain coordinator 100 leading to shipment of goods G200 from warehouse 140 to warehouse distribution center 150 via truck 142.

Scenario 200 begins with shipment 210 of goods G200 from warehouse/distribution center 150 to retailer 160 via truck 152. Shipment 210 was triggered by an order O200 from retailer 160 for goods G200 (and perhaps other goods) to warehouse and supply-chain coordinator 100 that occurred prior to scenario 200. Upon receiving order O200, warehouse and supply-chain coordinator 100 located a warehouse that had enough of goods G200 to satisfy order O200; in this case, warehouse/distribution center 150 has enough of goods G200 to satisfy order O200. Warehouse and supply-chain coordinator 100 ordered truck 152 to warehouse/distribution center 150 to load goods G200 (and any other goods available at warehouse/distribution center 150 to satisfy order O200) and deliver the loaded goods G200 to retailer 160.

After truck 152 has loaded goods G200, warehouse and supply-chain coordinator 100 communicates order-related data 220 with warehouse 140. In scenario 200, order-related data 220 includes an order from warehouse and supply-chain coordinator 100 to deliver goods G200 from warehouse 140 to warehouse/distribution center 150, an order to truck 142 to load goods G200 from warehouse 140, and orders to robots (and perhaps other agents) at warehouse 140 to load goods G200 onto truck 142. In other examples, warehouse and supply-chain coordinator 100 also includes a confirmation from warehouse 140 that goods G200 are available therein or a notification from warehouse 140 that goods G200 are not available.

After truck 142 is loaded with goods G200 at warehouse 140, shipment 222 begins where truck 142 conveys goods G200 (and perhaps other goods) to warehouse/distribution center 150. Upon arrival at warehouse/distribution center 150, goods G200 are unloaded from truck 142, and scenario 200 can be completed.

In a related scenario, order-related data 220 is communicated before shipment 210 begins. For example, order-related data 220 can include a prediction that retailer 160 will order goods G200 and/or a predictive order of goods G200 placed on behalf of retailer 160 before retailer 160 actually places an order for goods G200 with warehouse and supply-chain coordinator 100. The prediction of an order of goods G200 and/or the predictive order of goods G200 can be based on order-predictive data related to one or more entities, such as retailer 160, where the order-predictive data includes, but is not limited to:

point-of-sale (POS) data from retailer 160 indicating sales of goods G200,
  an inventory of goods G200 at retailer 160 (e.g., if warehouse and supply-chain coordinator 100 determines that retailer 160 has a relatively small quantity of goods G200, then warehouse and supply-chain coordinator 100 can predictively order goods G200 for retailer 160),
  data about historical orders from retailer 160 (e.g., retailer 160 has ordered goods G200 most or every day, three days, week, month, quarter, etc., and so warehouse and supply-chain coordinator 100 can predictively order goods G200 for retailer 160),
  Internet-related data, such as search query data related to goods G200, social-media data, search conversion rates related to goods G200, and/or other data available via the internet indicating customer interest in goods G200 (e.g., if warehouse and supply-chain coordinator 100 determines a relatively-large number of searches involving terms such as "G200" are being placed, perhaps by users in a region at or near retailer 160, then warehouse and supply-chain coordinator 100 can predictively order goods G200 for retailer 160), and
  at a indicating trends in POS data, inventory data, data about historical orders, Internet-related data, and/or other data In the related scenario, order-related data 220 includes a predictive order of goods G200 destined for retailer 160 that is sent to warehouse 140. After communicating the predictive order of goods G200 to warehouse 140, warehouse and supply-chain coordinator 100 orders two shipments: shipment 210 from warehouse 140 to replenish goods G200 at warehouse/distribution center 150 and shipment 222 from warehouse/distribution center 150 to retailer 160. If warehouse/distribution center 150 has enough of goods G200 to satisfy the predictive order, then shipments 210 and 222 can take place in parallel and/or shipment 222 can precede shipment 210. If warehouse/distribution center 150 does not have enough of goods G200 to satisfy the predictive order, then shipment 222 can precede shipment 210.

As such, scenario 200 can be considered to be a "reactive" scenario, where warehouse and supply-chain coordinator 100 reacts to order O200 for goods G200 from retailer 160 to replenish warehouse/distribution center 150. Also, the related scenario mentioned above can be considered to be a "proactive" scenario, where warehouse and supply-chain coordinator 100 issues a predictive order for goods G200 on behalf of retailer 160 without retailer 160 actually placing an order.

Generally speaking, order-related data, such as order-related data 220, can include one or more: orders, order-predictive data, predictions of orders, predictive orders, confirmations of orders, event notifications, notifications that orders cannot be carried out and/or satisfied, data about inspections of goods in and/or related to the supply chain, and/or other data associated with one or more orders involving a supply chain. In some embodiments, order-related data can be used, generated, and/or processed using machine-learning techniques utilizing neural networks to find patterns in data, such as order-related data, and generate predictive orders and/or other commands based on the patterns found in the data. These patterns can include, but are not limited to, patterns in the above-mentioned order-predictive data (e.g., data indicating trends) and/or other data. Other and/or additional techniques for using, generating, and/or processing order-related data can be used as well, or instead of, machine-learning techniques.

Figure 3:
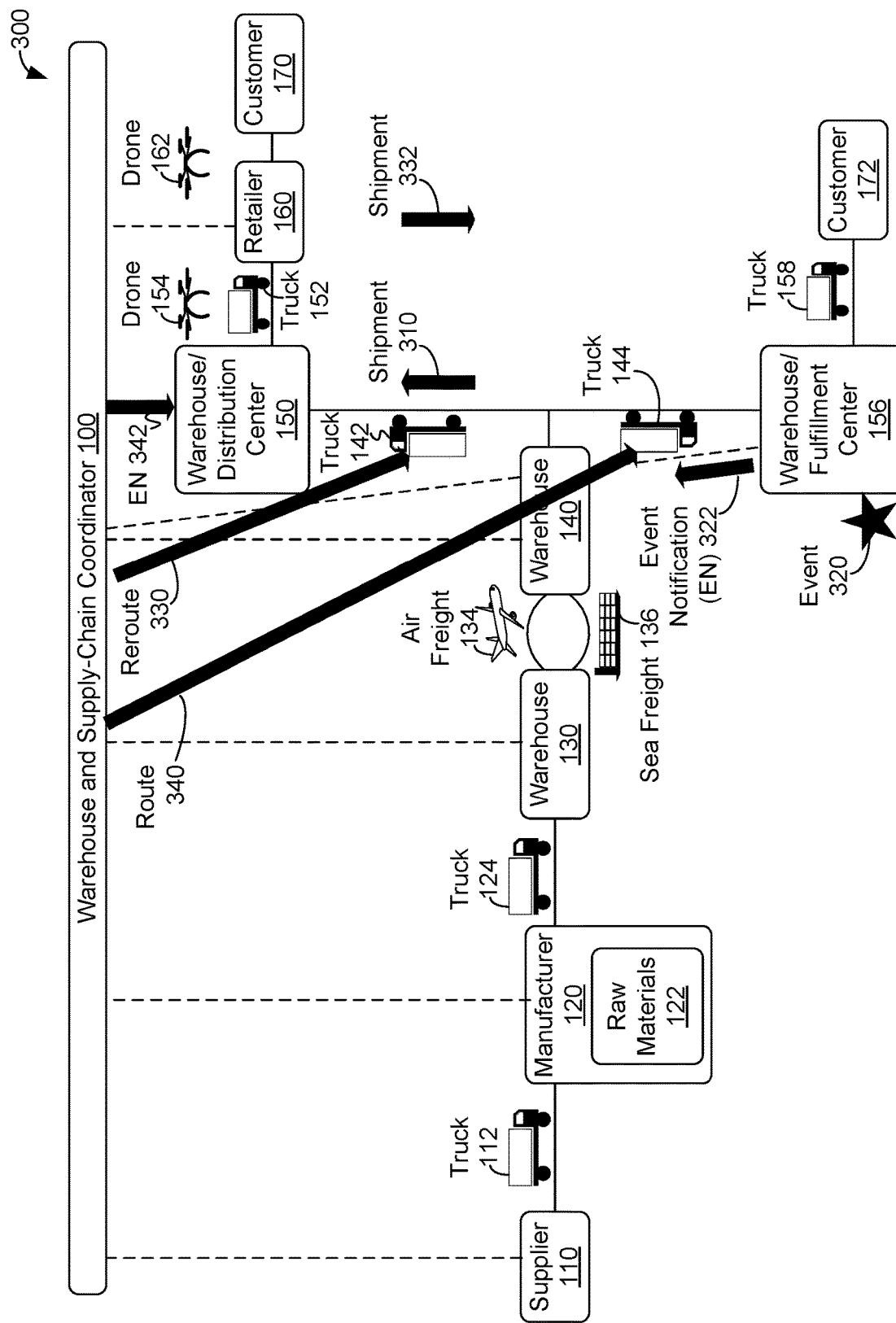
FIG. 3 illustrates a scenario where an event triggers re-routing of a shipment, in accordance with an example embodiment.

FIG. 3 illustrates scenario 300 where event 320 triggers re-routing of a shipment, in accordance with an example embodiment. Scenario 300 involves occurrence of event 320 associated with warehouse/fulfillment center 156 while shipment 310 of goods G300 is en route from warehouse 140 to warehouse/distribution center 150 via truck 142. Warehouse/fulfillment center 156 sends event notification 322 regarding event 320 to warehouse and supply-chain coordinator 100. Warehouse and supply-chain coordinator 100 determines that, because of event 320, warehouse/fulfillment center 156 has a higher priority for goods G300 than warehouse/distribution center 150. Subsequently, warehouse and supply-chain coordinator 100 sends reroute message 330 to reroute truck 142 to deliver goods G300 to warehouse/fulfillment center 156. Warehouse and supply-chain coordinator 100 sends route message 340 to truck 144 to route the truck to warehouse 140 to pick up goods G300 and deliver goods G300 to warehouse/distribution center 150. Additionally, warehouse and supply-chain coordinator 100 sends event notification 342 to inform warehouse/distribution center 150 that truck 142 was rerouted and that truck 144 will bring goods G300 to warehouse/distribution center 150.

At an onset of scenario 300, truck 142 is carrying goods G300 to warehouse/distribution center 150 as part of shipment 310. Then, event 320 occurs, where event 320 is related to warehouse/fulfillment center 156 and goods G300. As one example, if goods G300 includes bottled water, and event 320 is "a hurricane made landfall near warehouse/fulfillment center 156", then warehouse/fulfillment center 156 can have an increased demand for bottled water. As another example, if goods G300 includes team jerseys for Team A, and event 320 is "Team A was just announced as playing a big game near warehouse/fulfillment center 156", then warehouse/fulfillment center 156 can have an increased demand for Team A jerseys. As a third example, event 320 can be "warehouse/fulfillment center 156 has sold out of a month's supply of goods G300 in one day", then warehouse/fulfillment center 156 can have an increased demand for goods G300. Other events related to both goods G300 and warehouse/fulfillment center 156 are possible as well.

After event 320 occurs, warehouse/fulfillment center 156 sends event notification (EN) 322 informing warehouse and supply-chain coordinator 100 of the occurrence of event 320. In some examples, event notification 322 also includes a request for a change in priority for one or more goods; e.g., requesting an increased priority for snow shovels when event 320 is a prediction of an imminent blizzard, requesting a decreased priority for Team B related gear after a game with Team B is canceled, etc. Other reasons than increased or decreased demand for goods are possible for changing priority of delivery (or pick up) of goods to a location, such as a priority of delivery of goods G300 to warehouse/fulfillment center 156, e.g., reasons related to changes in costs, such as monetary costs for delivery and/or goods, reasons related to transportation of goods; e.g., a total amount of miles traveled by a vehicle destined for a location carbon-footprint-related costs, reasons related to an entity in the supply chain, such as a warehouse, vehicle, manufacturer, or supplier; e.g., an increase or decrease in capacity of a, damage to the entity, a surplus or deficit of goods at the entity, etc. Many other reasons for changing priority of goods, shipments, and/or entities in the supply chain are possible as well.

Scenario 300 continues with warehouse and supply-chain coordinator 100 receiving event notification 322. Then, based on event notification 322, warehouse and supply-chain coordinator 100 changes the priority of warehouse/fulfillment center 156 to have a higher priority for goods G300 than warehouse/distribution center 150, and subsequently determines to reroute truck 142 to warehouse/fulfillment center 156 to deliver high-priority goods G300. Rerouting truck 142 effectively cancels shipment 310 to warehouse/distribution center 150. In other scenarios, warehouse and supply-chain coordinator 100 can change one or more priorities associated with goods G300, truck 142, warehouse/distribution center 150, warehouse/fulfillment center 156, and/or shipment 310 for other reasons than event notification 322; e.g., some or all of the reasons listed above for changing priorities.

After warehouse and supply-chain coordinator 100 determines to reroute truck 142, warehouse and supply-chain coordinator 100 sends reroute message 330 to truck 142 to change truck 142's route to deliver goods G300 to warehouse/fulfillment center 156. In response to reroute message 330, truck 142 stops shipment 310 and begins shipment 332 to warehouse/fulfillment center 156.

Scenario 300 continues with warehouse and supply-chain coordinator 100 determining that a quantity of goods G300 are available at warehouse 140, and that truck 144 is available to deliver goods G300 from warehouse 140 to warehouse/distribution center 150. Then, warehouse and supply-chain coordinator 100 sends route message 340 to truck 144 to route the truck to warehouse 140 to pick up goods G300 and deliver goods G300 to warehouse/distribution center 150. Additionally, warehouse and supply-chain coordinator 100 sends event notification 342 to inform warehouse/distribution center 150 that truck 142 was rerouted and that truck 144 will bring goods G300 to warehouse/distribution center 150. In some examples, event notification 342 includes an ETA for truck 142/goods G300.

After truck 142 delivers goods G300 to warehouse/fulfillment center 156 as part of shipment 332, scenario 300 can be completed. In other scenarios, truck 142 delivers goods G300 to warehouse/fulfillment center 156 before truck 144 is routed to warehouse 140 and/or before event notification 342 is sent to warehouse/distribution center 150.

Figure 4:
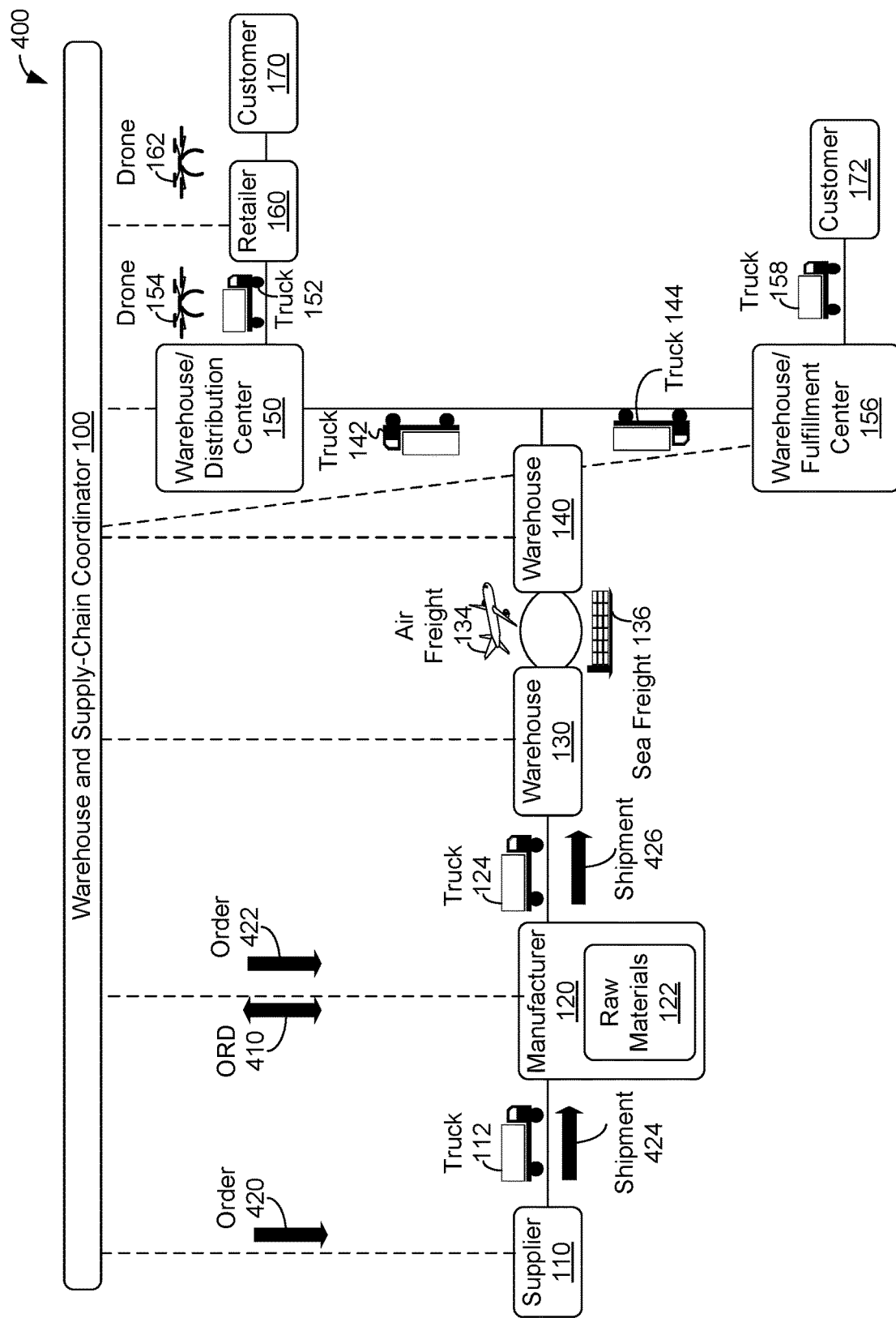
FIG. 4 illustrates a scenario where order-related data triggers shipments from a supplier to a manufacturer and from the manufacturer to a warehouse, in accordance with an example embodiment.

FIG. 4 illustrates scenario 400 where order-related data 410 triggers shipments 424, 426 from a supplier to a manufacturer and from the manufacturer to a warehouse, in accordance with an example embodiment. Scenario 400 involves communication of order-related data 410 between warehouse and supply-chain coordinator 100 and manufacturer 120 leading to warehouse and supply-chain coordinator 100 sending order 420 to supplier 110, where order 420 requests shipment 424 for raw materials 122 to manufacturer 120. Warehouse and supply-chain coordinator 100 also sends order 422 to manufacturer 120 requesting forecast amount FA400 of goods G400 and subsequent shipment of the goods G400 to warehouse 130. The forecast amount FA400 of goods G400 are manufactured by manufacturer 120 and carried as part of shipment 426 using truck 124 to warehouse 130. Once shipment 426 arrives at warehouse 130 and goods G400 are unloaded from truck 124 at warehouse 130, scenario 400 ends.

FIG. 4 shows that scenario 400 begins with communication of order-related data 410 between warehouse and supply-chain coordinator 100 and manufacturer 120. Specifically for scenario 400, order-related data 410 includes a request from warehouse and supply-chain coordinator 100 for a maximum amount of goods G400 that can be made based on an amount of raw materials 122 at a location of manufacturer 120. In response to the request, manufacturer 120 sends a response message informing warehouse and supply-chain coordinator 100 that an amount A400 of goods 6400 can be made with the amount of raw materials 122 at the location of manufacturer 120, and that raw materials 122 is a limiting factor; that is, the amount of goods G400 that can be manufactured is limited by an amount of raw materials 122.

After receiving the response message, warehouse and supply-chain coordinator 100 determines a forecast amount FA400 of goods G400 that will likely be required at warehouse 130. In scenario 400, the forecast amount FA400 of goods G400 is determined using order-predictive data for goods G400, where order-predictive data is discussed above in the context of scenario 200 and FIG. 2. More specifically, warehouse and supply-chain coordinator 100 determines forecast amount FA400 based on orders for goods G400 and trends in order data indicating orders for goods G400 that are likely to arrive in the near future.

Warehouse and supply-chain coordinator 100 also determines that the forecast amount FA400 of goods G400 is greater than the amount A400 provided by manufacturer 120 in the response message. The response message also indicates that raw materials 122 are a limiting factor for production of goods G400. As raw materials 122 are a limiting factor for production of goods G400, warehouse and supply-chain coordinator 100 determines manufacturer 120 will need more raw materials 122 to produce at least the forecast amount FA400 of goods G400.

After determining that manufacturer 120 will need more raw materials 122, warehouse and supply-chain coordinator 100 sends order 420 to supplier 110 for raw materials 122 on behalf of manufacturer 120. In response to order 420, supplier 110 produces raw materials 122 and puts raw materials 122 on truck 112 as part of shipment 424 to manufacturer 120. In some scenarios, supplier 110 informs warehouse and supply-chain coordinator 100 and/or manufacturer 120 that raw materials 122 are on truck 112 as part of shipment 424.

Warehouse and supply-chain coordinator 100 also sends order 422 to manufacturer 120 requesting forecast amount FA400 of goods G400 and subsequent shipment of the goods G400 to warehouse 130. Order 422 also informs manufacturer 120 that order 420 for raw materials 122 has been placed on behalf of manufacturer 120. In some scenarios, order 422 includes information about shipment 424 and/or truck 112; e.g., ETA of shipment 424, identifying information about truck 112, a carrier providing shipment 424, etc.

After raw materials 122 in shipment 424 are unloaded at manufacturer 120, and manufacturer 120 receives order 422 for the forecast amount FA400 of goods 6400, manufacturer 120 manufactures the forecast amount FA400 of goods G400. Upon manufacture of the forecast amount FA400 of goods G400, the forecast amount FA400 of goods G400 are carried as part of shipment 426 using truck 124 to warehouse 130. Once shipment 426 arrives at warehouse 130 and goods G400 are unloaded from truck 124 at warehouse 130, scenario 400 ends.

Scenario 400 can be considered to be a proactive scenario, as order 420 for raw materials is made before order 422 for goods 6400. In a related reactive scenario, warehouse and supply-chain coordinator 100 first places order 422 with manufacturer 120 and manufacturer 120 subsequently places order 420 to supplier 110 for raw materials 122.

Figure 5:
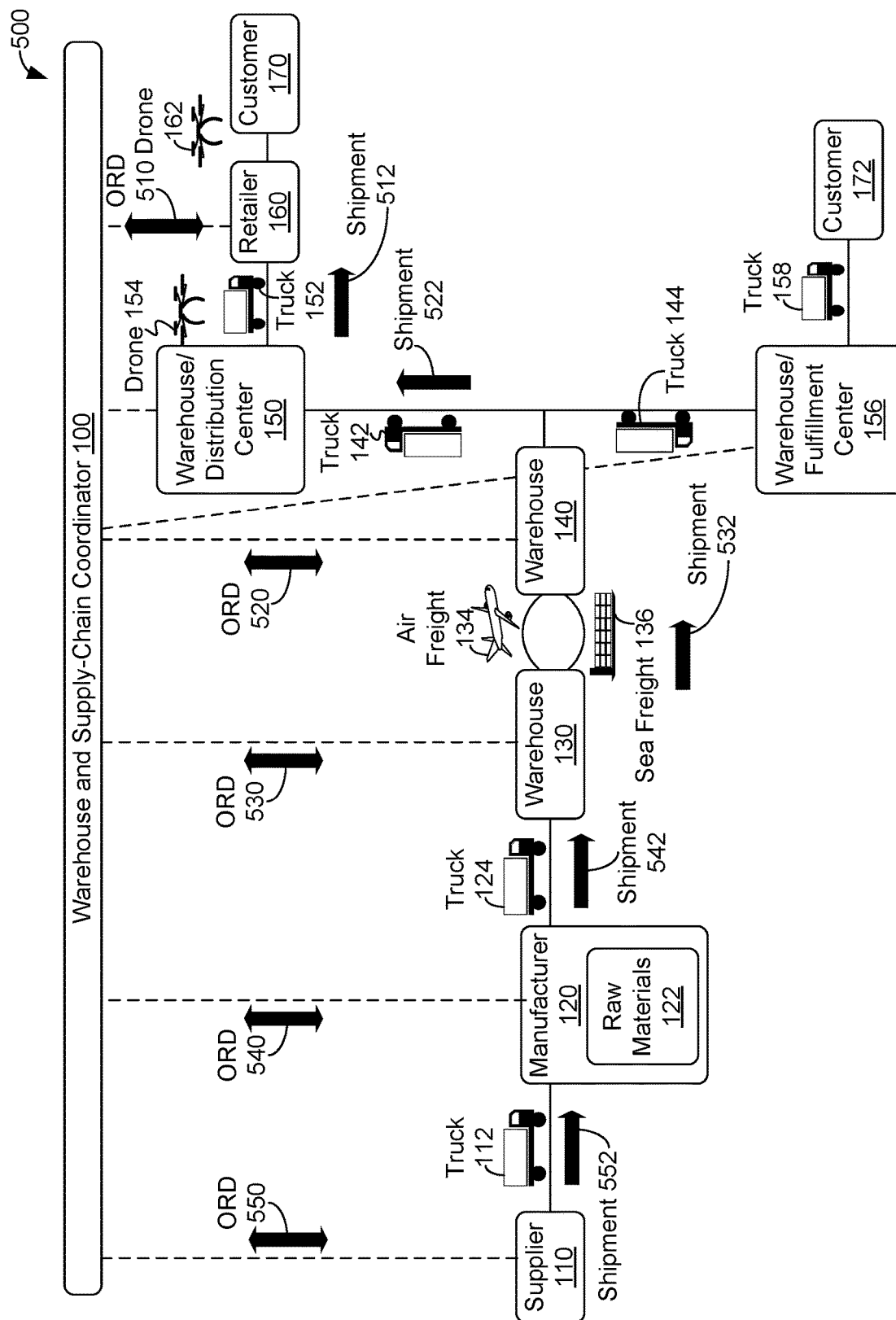
FIG. 5 illustrates a scenario where order-related data triggers shipments throughout a supply chain, in accordance with an example embodiment.

FIG. 5 illustrates a scenario 500 where order-related data 510, 520, 530, 540, 550 triggers shipments 512, 522, 532, 542, 552 throughout a supply chain, in accordance with an example embodiment. Scenario 500 involves order-related data 510, 520, 530, 540, 550 regarding goods 6500 communicated between warehouse and supply-chain coordinator 100 and retailer 160, warehouse 140, warehouse 130, manufacturer 120, and supplier 110, respectively. Based on order-related data 510, 520, 530, 540, 550, respective shipments 512, 522, 532, 542, 552 related to goods G500 are made, with shipment 512 between warehouse/distribution center 150 and retailer 160, shipment 522 between warehouse 140 and warehouse/distribution center 150, shipment 532 between warehouse 130 and warehouse 140 (via sea), shipment 542 between manufacturer 120 and warehouse 130, and shipment 542 between supplier 110 and manufacturer 120. Upon completion of all of shipments 512, 522, 532, 542, 552, scenario 500 can be completed.

Scenario 500 is a proactive scenario, where warehouse and supply-chain coordinator 100 first receives order-related data 510 that includes POS data indicating sales of goods G500 at retailer 160. Utilizing the POS data in order-related data 510 and other order-predictive data, warehouse and supply-chain coordinator 100 determines a forecast amount FA500 of goods G500 to be provided throughout the supply chain shown in FIG. 5. Warehouse and supply-chain coordinator 100 also determines that to have sufficient supplies of goods G500 to meet forecast amount FA500 throughout the supply chain that manufacturer 120 needs more raw materials for goods G500 to produce the forecast amount FA500 of goods G500, and that some of the forecast amount FA500 of goods G500 are to be stored at each of warehouse 130, warehouse 140, warehouse/distribution center 150, and an additional amount AM500 of goods G500 are to be ordered on behalf of retailer 160 based on the POS data.

Then, warehouse and supply-chain coordinator 100 and supplier 110 communicate order-related data 550 to order a supply of raw materials for goods G500 on behalf of manufacturer 120, and coordinate shipment of the supply of raw materials for goods G500 to be shipped to manufacturer 120 as part of shipment 552 carried by truck 112. Warehouse and supply-chain coordinator 100 and manufacturer 120 communicate order-related data 540 to inform manufacturer 120 about the supply of raw materials for goods G500 arriving via shipment 552/truck 112, to order the forecast amount FA500 of goods G500, and to coordinate shipment of the forecast amount FA500 of goods G500 to warehouse 130 as part of shipment 542 carried by truck 124.

Scenario 500 continues with warehouse and supply-chain coordinator 100 and warehouse 130 communicating order-related data 530 to inform warehouse 130 about shipment 542 of the forecast amount FA500 of goods G500 arriving via truck 124, to store a portion P130 of the forecast amount FA500 of goods G500 at warehouse 130, and to coordinate shipment of the remaining amount RA130 of goods G500 to warehouse 140 as part of shipment 532 carried by sea freight 136. Then, warehouse and supply-chain coordinator 100 and warehouse 140 communicate order-related data 520 to inform warehouse 140 about shipment 532 of the remaining amount RA130 of goods G500 arriving via sea freight 136, to store a portion P140 of the remaining amount RA130 of goods G500 at warehouse 140, and to coordinate shipment of a now-remaining amount RA140 goods G500 to warehouse/distribution center 150 as part of shipment 522 carried by truck 142.

Scenario 500 continues with warehouse and supply-chain coordinator 100 and warehouse 140 communicating order-related data 520 to inform warehouse 140 about shipment 532 of the remaining amount RA130 of goods G500 arriving via sea freight 136, to store a portion P140 of the remaining amount RA130 of goods G500 at warehouse 140, and to coordinate shipment of additional amount AM500 of goods G500 to retailer 160 via shipment 522 carried by truck 142. In scenario 500, shipment 522 unexpectedly terminates at warehouse/distribution center 150, and so warehouse and supply-chain coordinator 100 arranges shipment 512 of the additional amount AM500 of goods G500 to retailer 160 carried by truck 152. Upon completion of shipment 512, scenario 500 can be completed.

In a related proactive scenario, warehouse and supply-chain coordinator 100 first receives order-related data 550 from supplier 110 indicating that raw materials for producing goods G500 are available and ready for shipment to manufacturer 120. Warehouse and supply-chain coordinator 100 then communicates order-related data 540 to manufacturer 120 requesting production of goods G500 and shipment of the produced goods G500 via shipment 542 on truck 124 to warehouse 130, and communicates additional order-related data 550 to supplier 110 ordering raw materials for goods G500 to be shipped to manufacturer 120 via shipment 552 on truck 112.

Upon reception of the raw materials for goods G500 on shipment 552, manufacturer 120 produces goods 6500 and ships the produced goods G500 via shipment 542 on truck 124 to warehouse 130. Warehouse and supply-chain coordinator 100 communicates order-related data 530 to warehouse 130 requesting storage of goods G500 received via shipment 542 and subsequent shipment of goods G500 to warehouse 140 as part of shipment 532 carried by sea freight 136. Warehouse and supply-chain coordinator 100 communicates order-related data 520 to warehouse 140 requesting storage of goods G500 received via shipment 532 and subsequent shipment of goods G500 to warehouse/distribution center 150 as part of shipment 522 carried by truck 142.

Warehouse and supply-chain coordinator 100 communicates order-related data 510 to retailer 160 indicating an order of goods G500 placed on behalf of retailer 160 will arrive from warehouse/distribution center 150 via shipment 512 carried by truck 152. In this related scenario, retailer 160 can have an outstanding, unfulfilled order for goods G500 that is at least partially fulfilled by the order of goods G500 arriving via shipment 512.

In a related reactive scenario, retailer 160 sends order-related data 510 with an order for an additional amount AM500 of goods G500 to warehouse and supply-chain coordinator 100. Warehouse and supply-chain coordinator 100 inquires at manufacturer 120, warehouse 130, and warehouse 140 as part of respective order-related data 540, 530, and 520 to locate the additional amount AM500 of goods G500, but no goods G500 are available. Warehouse and supply-chain coordinator 100 then coordinates with supplier 110 via order-related data 550 and manufacturer 120 to order raw materials for at least the additional amount AM500 of goods G500 from supplier 110 and to ship the raw materials via shipment 552 carried by truck 112. Upon reception of the raw materials, manufacturer 120 manufactures the at least the additional amount AM500 of goods G500 and informs warehouse and supply-chain coordinator 100 that the at least the additional amount AM500 of goods G500 are ready for shipment.

Warehouse and supply-chain coordinator 100 uses order-related data 530, 520, and 510 to coordinate shipment of the additional amount AM500 of goods G500 to retailer 160 via: shipment 542 carried by truck 124 to warehouse 130, shipment 532 carried by sea freight 136 to warehouse 140, and shipment 522 carried by truck 142 to retailer 160 bypassing warehouse/distribution center 150. Upon completion of shipment 522 and delivery of the additional amount AM500 of goods G500 to retailer 160, this related reactive scenario can be completed. Other proactive and reactive scenarios are possible as well.

Figure 6:
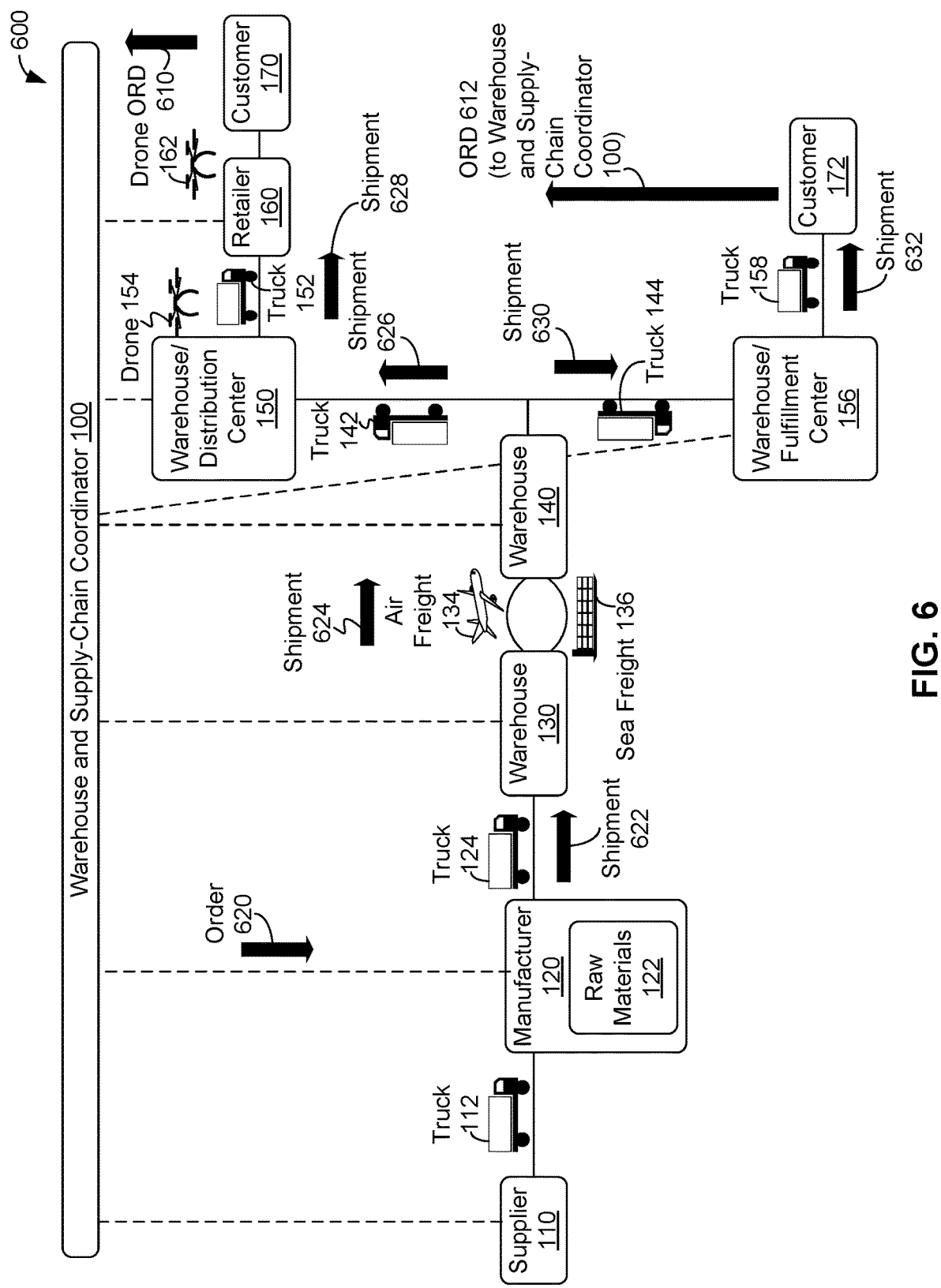
FIG. 6 illustrates a scenario where order-related data from a customer triggers shipments throughout a supply chain, in accordance with an example embodiment.

FIG. 6 illustrates scenario 600 where order-related data 610, 612 from customers 170, 172 triggers order 620 and shipments 622, 624, 626, 628, 630, 632 throughout a supply chain, in accordance with an example embodiment.

Scenario 600 begins with order-related data 610 from customer 170 and order-related data 612 from customer 172 being transmitted to warehouse and supply-chain coordinator 100. In scenario 600, order-related data 610 includes an indication of an electronic commerce (e-commerce) purchase of a quantity Q170 of goods G600 and order-related data 612 includes search query data related to goods G600 and a subsequent conversion of the search query into an e-commerce purchase of a quantity Q172 of goods G600. In other scenarios, other and/or additional order-related data 610, 612 are possible as well.

In scenario 600, warehouse and supply-chain coordinator 100 analyzes order-related data 610, 612 and additional data, such as but not limited to the above-mentioned order-predictive data, to both fulfill the purchases made by respective customers 170, 172 and to order additional goods G600 to be stored in the supply chain; e.g., at warehouse/distribution center 150, warehouse/fulfillment center 156 and/or retailer 160, for future distribution of goods G600. Upon reception of order-related data 610, 612, warehouse and supply-chain coordinator 100 sends order 620 to manufacturer 120 for a complete quantity CQ600 of goods G600.

In scenario 600, warehouse and supply-chain coordinator 100 arranges shipment 622 of complete quantity CQ600 of goods G600 to warehouse 130 via truck 124. For example, warehouse and supply-chain coordinator 100 can send an order to a shipper associated with truck 124 to order pick up of complete quantity CQ600 of goods G600 at a first mutually-agreed upon date and subsequent delivery of the complete quantity CQ600 of goods G600 at warehouse 130 at a second mutually-agreed upon date. In another example where truck 124 is an autonomous vehicle in communication with warehouse and supply-chain coordinator 100, warehouse and supply-chain coordinator 100 determines a pick-up time PT600 for complete quantity CQ600 of goods G600 at manufacturer 120. Then, warehouse and supply-chain coordinator 100 directs truck/autonomous vehicle 124 to arrive at manufacturer 120 at PT600 to pick up the complete quantity CQ600 of goods G600 and subsequently deliver the goods to warehouse 130. Other techniques for arranging shipments of goods using supply-chain coordinator 100 are possible as well; e.g., supply-chain coordinator 100 arranging shipment 622 by communicating directly with a vehicle that that is not an autonomous vehicle and/or a vehicle owned by the same entity that owns warehouse and supply-chain coordinator 100.

Upon production of complete quantity CQ600 of goods G600, truck 124 picks up complete quantity CQ600 of goods G600 and conveys the goods as part of shipment 622 to warehouse 130. Complete quantity CQ600 of goods G600 are then unloaded and stored at warehouse 130. Warehouse and supply-chain coordinator 100 arranges shipment 624 of a first portion FP600 of the complete quantity CQ600 of goods G600 from warehouse 130 to warehouse 140 via air freight 134, where FP600≤CQ600. In scenario 600, FP600 equals CQ600; that is, the complete quantity CQ600 of goods G600 is shipped via shipment 624/air freight 134 to warehouse 140. In other scenarios where FP600<CQ600, a remaining portion of a quantity (CQ600−FP600) of goods G600 can be stored at warehouse 130; i.e. for later shipment via air freight 134, sea freight 136, and/or via another shipment means.

Upon arrival of air freight 134, the first portion FP600 of goods G600 are unloaded from air freight 134 and subsequently stored at warehouse 140. Of the first portion FP600 of goods G600, a second portion SP600 of goods G600 are loaded onto truck 142 as part of shipment 626 and a third portion TP600 of goods G600 are loaded onto truck 144 as part of shipment 630. Both shipments 626 and 630 are arranged by warehouse and supply-chain coordinator 100.

In scenario 600, second portion SP600 and third portion TP600 equal first portion FP600; in other scenarios, some of second portion SP600 and/or third portion TP600 of goods G600 are stored in warehouse 140; i.e., for later shipment by truck 142, truck 144, and/or via another shipment means.

Upon arrival of truck 142 carrying shipment 626 at warehouse/distribution center 150, second portion SP600 of goods G600 are unloaded from truck 142 and stored at warehouse/distribution center 150. Then, warehouse and supply-chain coordinator 100 arranges for shipment of at least the quantity Q170 of goods G600 from warehouse/distribution center 150 to retailer 160 via shipment 628 carried by truck 152 and subsequent shipment of quantity Q170 of goods G600 from retailer 160 to customer 170 via drone 162 to fulfill the order placed as part of order-related data 610.

Upon arrival of truck 144 carrying shipment 630 at warehouse/fulfillment center 156, third portion TP600 of goods G600 are unloaded from truck 144 and stored at warehouse/fulfillment center 156. Then, warehouse and supply-chain coordinator 100 arranges for shipment of the quantity Q172 of goods G600 from warehouse/fulfillment center 156 to customer 172 via shipment 632 carried by truck 158 to fulfill the order placed as part of order-related data 612. Once the orders placed as part of order-related data 610, 612 are fulfilled, scenario 600 can be completed.

In scenario 600, warehouse and supply-chain coordinator 100 obtains at least shipping and tracking information for all shipments of supplies and goods, including shipments of goods G600, throughout the supply chain shown in FIG. 6. For example, upon receiving the order from customer 170 as part of order-related information 610 for quantity Q170 of goods G600, warehouse and supply-chain coordinator 100 searches its own data to determine whether goods G600 can be supplied from an existing stock of goods G600; e.g., a quantity of goods G600 that is greater than Q170 and is located in a warehouse or other facility in communications with warehouse and supply-chain coordinator 100. In scenario 600, warehouse and supply-chain coordinator 100 did not find the quantity Q170 of goods G600, and so warehouse and supply-chain coordinator 100 sends order 620 to manufacturer 120 for goods G600. Also, warehouse and supply-chain coordinator 100 updates shipping information for the order placed by customer 170 to indicate that the quantity Q170 of goods G600 are on order. In this instance, an estimated delivery date is determined when the quantity Q170 of goods G600 are estimated to arrive at customer 170; i.e., via shipments 622, 624, 626, 628, and a flight of drone 162.

Both while shipments 622, 624, 626, 628 are underway and as each of the shipments is completed, warehouse and supply-chain coordinator 100 updates the shipping information for customer 170. Warehouse and supply-chain coordinator 100 also maintains tracking information for the trucks and air freight used to convey goods G600 from manufacturer 120 to customer 170. That is, warehouse and supply-chain coordinator 100 maintains time and location information for each of shipments 622, 624, 626, 628; e.g., at time 7622, shipment 622 is 50 miles (or 80 kilometers) west of warehouse 130 and is expected to arrive at warehouse 130 at a later time T623, and that shipment 624/air freight 134 is destined to leave from warehouse 130 at a time T624 destined for warehouse 140.

Also, warehouse and supply-chain coordinator 100 can maintain manifest information for some or all shipments in the supply chain shown in FIGS. 2-6. For example, the manifest information for shipment 622 includes a listing of items included in the shipment; e.g., the listing includes complete quantity CQ600 of goods G600 as well as any other goods shipped from manufacturer 120 to warehouse 130 via truck 124 that is part of shipment 622.

Figure 7:
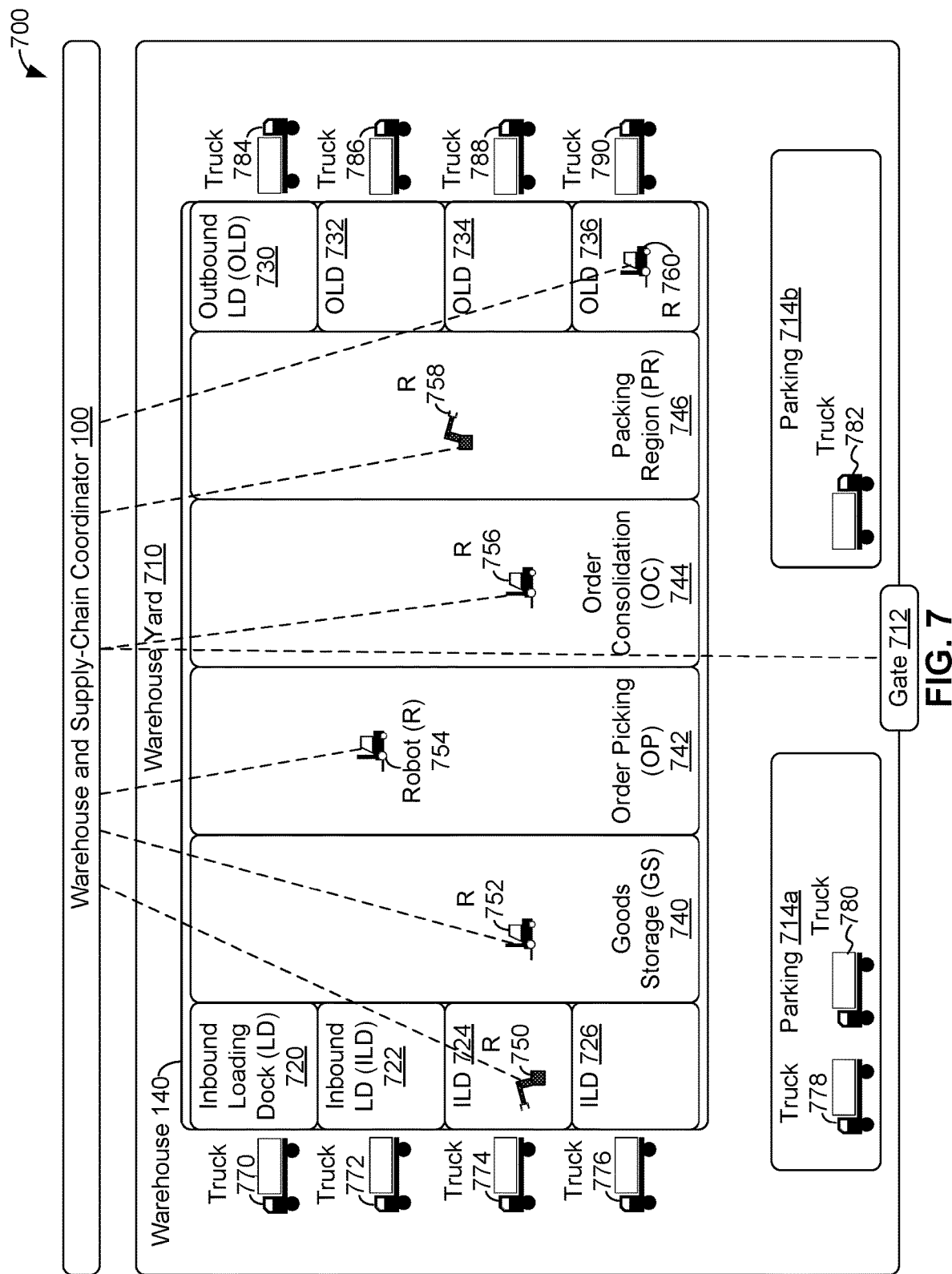
FIG. 7 depicts a system with a warehouse and supply chain coordinator, trucks, and robots associated with a warehouse, in accordance with an example embodiment.

FIG. 7 depicts system 700 with warehouse and supply chain coordinator 100 associated with warehouse 140, with system 700 including gate 712 and robots 750, 752, 754, 756, 758, 760, in communication with warehouse and supply chain coordinator 100, as indicated by dashed lines, in accordance with an example embodiment. In some examples, system 700 further includes some or all of trucks 770, 772, 774, 776, 778, 780, 782, 784, 786, 788, and 790.

Warehouse 140 includes four inbound loading docks (ILDs) 720, 722, 724, 726 where goods are unloaded from vehicles, such as trucks 770, 772, 774, 776 for storage within warehouse 140. Warehouse 140 also includes four outbound loading docks (OLDS) 730, 732, 734, 736 where goods are taken from warehouse 140 and loaded onto vehicles, such as trucks 784, 786, 788, 790, for shipment to one or more destinations. Between inbound loading docks 720, 722, 724, 726 and outbound loading docks 730, 732, 734, 736, warehouse 140 is divided into four areas: goods storage (GS) 740, order picking (OP) 742, order consolidation (OC) 744, and packing region (PR) 746. For example, a pallet of goods PG700 arriving at warehouse 140 via inbound loading dock 720 can be initially unloaded from a vehicle in warehouse yard 710 adjacent to inbound loading dock 720 to goods storage 740. Then, when an order O700 for pallet of goods PG700 is received, the pallet of goods PG700 can be taken from goods storage 740 to order picking 742 for selection as part of the order O700 and to order consolidation 744 to be grouped with other pallets of goods into group of pallets GRP700 to fulfill order O700. Then, group of pallets GRP700 can be taken to packing region 746 to be readied for shipment via an outbound loading dock; e.g, outbound loading dock 730 onto a vehicle such as truck 784 to fulfill order O700. In some examples, warehouse 140 has more or fewer inbound loading docks and/or outbound loading docks. In other examples, warehouse 140 has loading docks that are not distinguished between inbound loading docks and outbound loading docks. In still other example, warehouse 140 has more, fewer, and/or different regions than goods storage 740, order picking 742, order consolidation 744, and packing region 746.

Robots 750, 752, 754, 756, 758, 760 can be used to perform various tasks related to warehouse 140, such as, but not limited to, tasks related to: unloading pallets of goods from vehicles at inbound loading docks 720, 722, 724, 726, storing the unloaded pallets of goods within warehouse 140 (e.g., at goods storage 740), picking pallets of goods to fulfill orders, consolidating/grouping pallets of goods for shipment, packing pallets of goods for shipment, and loading pallets of goods onto vehicles at outbound loading docks 730, 732, 734, 736, in some examples, system 700 has more, fewer, and/or different robots. In the example shown in FIG. 7, warehouse and supply-chain coordinator 100 is in communication with each of robots 750, 752, 754, 756, 758, 760 so that warehouse and supply chain coordinator 100 can send commands and/or other messages to the robots and receive responses and/or other messages from the robots.

FIG. 7 shows warehouse 140 surrounded by warehouse yard 710, where vehicles, such as trucks 770-790, can maneuver in and around warehouse 140, load and unload goods to and from warehouse 140 using loading docks 720-736, and park in parking areas 714a, 714b. Warehouse 140 and warehouse yard 710 is protected by gate 712. Gate 712 can be opened and closed based on commands/messages from warehouse and supply-chain coordinator 100.

FIGS. 8, 9, 10, 11, 12, 13, 14, 15, and 16 illustrate scenario 800 where trucks arrive, load, unload, and depart a warehouse. Scenario 800 begins with truck 810 arriving at gate 712 of warehouse yard 710 and warehouse 140. Warehouse and supply-chain coordinator 100 determines that truck 810 has to park and wait for a time slot at an incoming loading dock, and so allocates parking spot 842 for truck 810, where truck 810 is parked. Warehouse and supply-chain coordinator 100 then allocates a time slot at incoming loading dock 724 starting at time T1 to truck 810, allocates space within warehouse 140 for storage of goods G1 carried by truck 810, and allocates robot 752 to unload truck 810. Goods G1 are inspected by robot 752 and are found to be in compliance with a contract for goods G1. After the successful inspection of goods G1, warehouse and supply-chain coordinator 100 directs robots 752 and 756 to unload goods G1 from truck 810 to area 922 in goods storage 740 of warehouse 140. Subsequently, truck 810 leaves warehouse 140 and warehouse yard 710.

Scenario 800 continues with warehouse and supply-chain coordinator 100 directing robots 752, 754, and 756 to move pallets P10, P11, and P12 to area 1112 in packing region 746 of warehouse 140 in preparation for arrival of truck 1210. Truck 1210 is delayed, and truck 1220 arrives before truck 1210. Upon arrival of truck 1220, warehouse and supply-chain coordinator 100 allows entry of truck 1220 via gate 712 and allocates a time slot to load truck 1220 at outbound loading dock 734 immediately. Truck 1220 enters warehouse yard 710 and parks at outbound loading dock 734. While truck 1220 is making its way to outbound loading dock 734, warehouse and supply-chain coordinator 100 directs robots 752 and 756 to rearrange pallet arrangement 1310 by moving pallets P20 and P21 closer to outbound loading dock 734 since pallets P20 and P21 are to be loaded onto truck 1220. Warehouse and supply-chain coordinator 100 also directs robots 752 and 756 to load pallets P20 and P21 onto truck 1220. After pallets P20 and P21 are loaded onto truck 1220, truck 1220 departs. Subsequently, truck 1210 arrives at warehouse 140 and parks at outbound loading dock 734. Warehouse and supply-chain coordinator 100 directs robots 752, 754, and 756 to load pallets P10, P11, and P12 onto truck 1210. After pallets P20 and P21 are loaded onto truck 1210, truck 1210 departs and warehouse and supply-chain coordinator 100 directs robots 752 and 760 to move pallets P30, P31, and P32 closer to outbound loading dock 734 in preparation for a next arriving truck. After pallets P30, P31, and P32 have been moved closer to outbound loading dock 734, scenario 800 can be completed.

Figure 8:
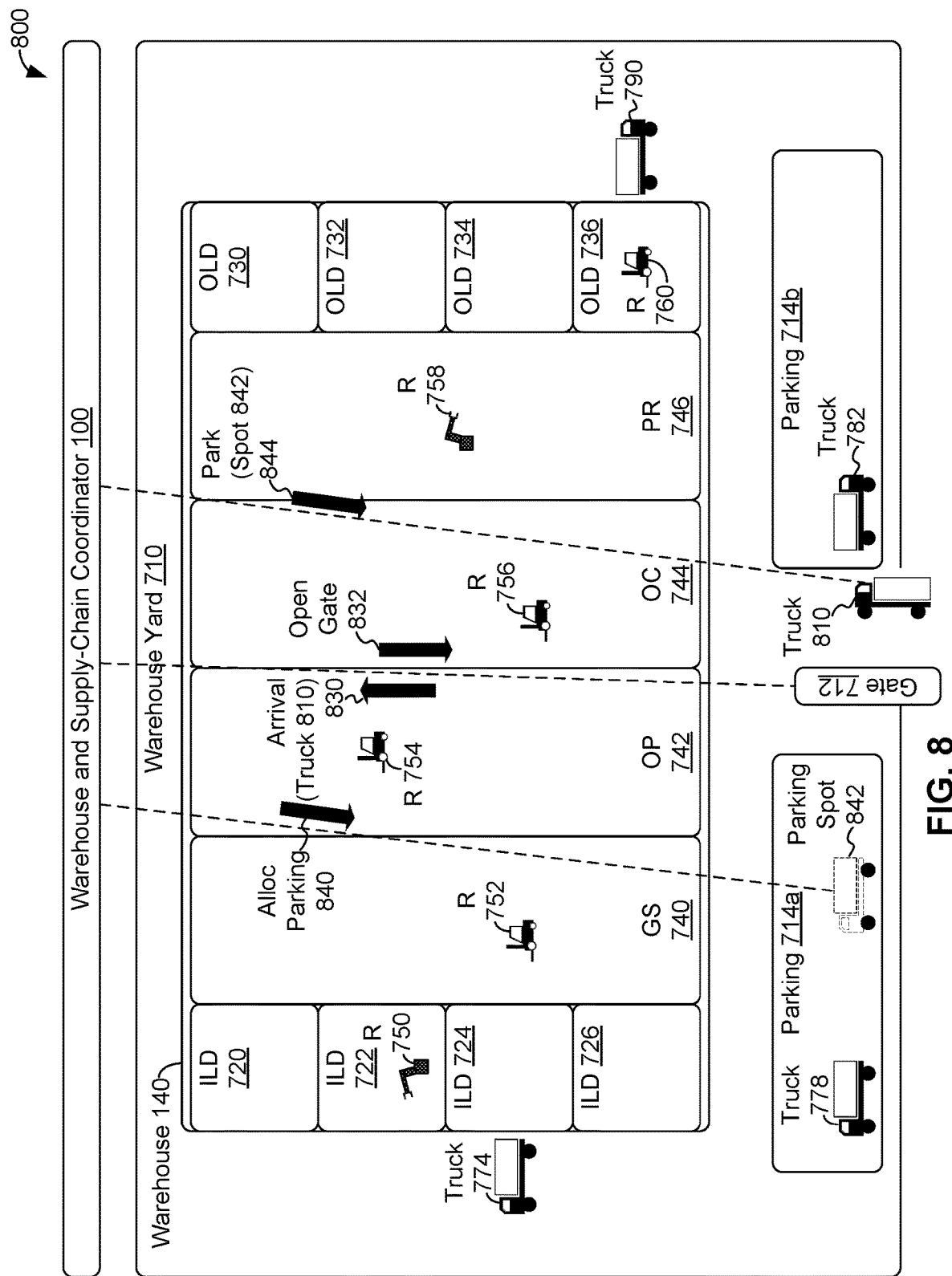
FIGS. 8, 9, 10, 11, 12, 13, 14, 15, and 16 illustrate a scenario where trucks arrive, load, unload, and depart a warehouse, in accordance with an example embodiment.

FIG. 8 shows that scenario 800 begins with truck 810 arriving at gate 712 of warehouse yard 710 that surrounds warehouse 140. In scenario 800, truck 810 carries goods G1 destined for warehouse 140. Upon arrival of truck 810, gate 712 sends arrival message 830 to inform warehouse and supply-chain coordinator 100 of the arrival of truck 810. In response, warehouse and supply-chain coordinator 100 sends open gate message 832 to gate 712 to open the gate and allow truck 810 to enter into warehouse yard 710.

After receiving arrival message 830, warehouse and supply-chain coordinator 100 determines that inbound loading dock 724 is to be used to load goods onto truck 810, and that inbound loading dock 724 is currently occupied with the loading of truck 774 as shown at a left side of FIG. 8. Warehouse and supply-chain coordinator 100 then allocates 840 a parking spot 842 to truck 810 and sends park message 844 directing truck 810 to park in parking spot 842.

Figure 9:
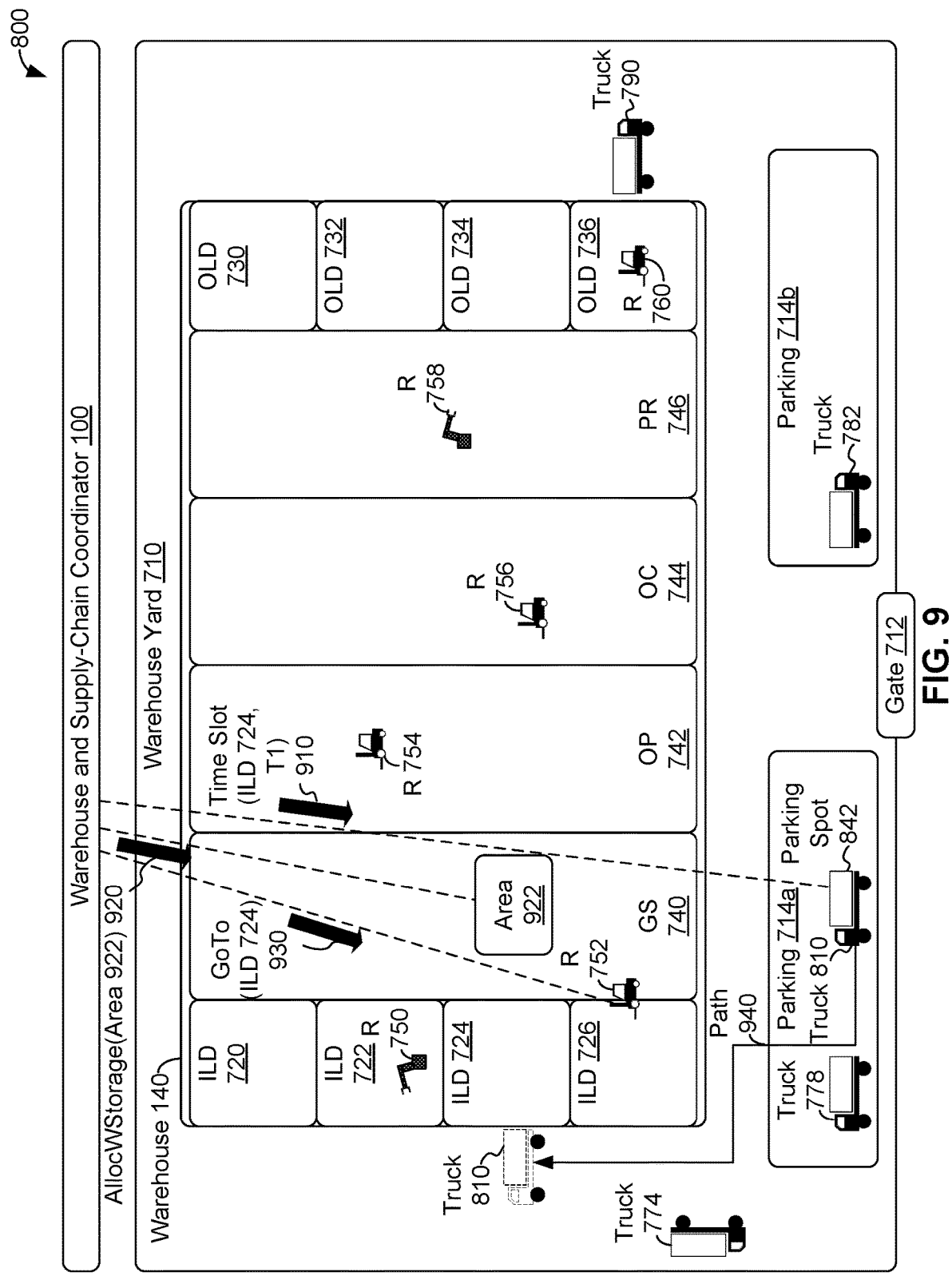

FIG. 9 shows that scenario 800 continues after truck 810 has parked in parking spot 842. Warehouse and supply-chain coordinator 100 allocates a time slot starting at time T1 for inbound loading dock 724 to truck 810, and informs truck 810 of this time slot allocation using time slot message 910. Warehouse and supply-chain coordinator 100 also allocates an area, area 922, within goods storage 740 of warehouse 140 for storing pallets unloaded from truck 810, as indicated by allocate warehouse storage (AllocWStorage) message 920. Warehouse and supply-chain coordinator 100 further sends GoTo message 930 directing robot 752 to travel to incoming loading dock 724. Just before time T1, truck 774 departs from incoming loading dock 724 and truck 810 travels along path 940 to park at incoming loading dock 724 at time T1.

Figure 10:
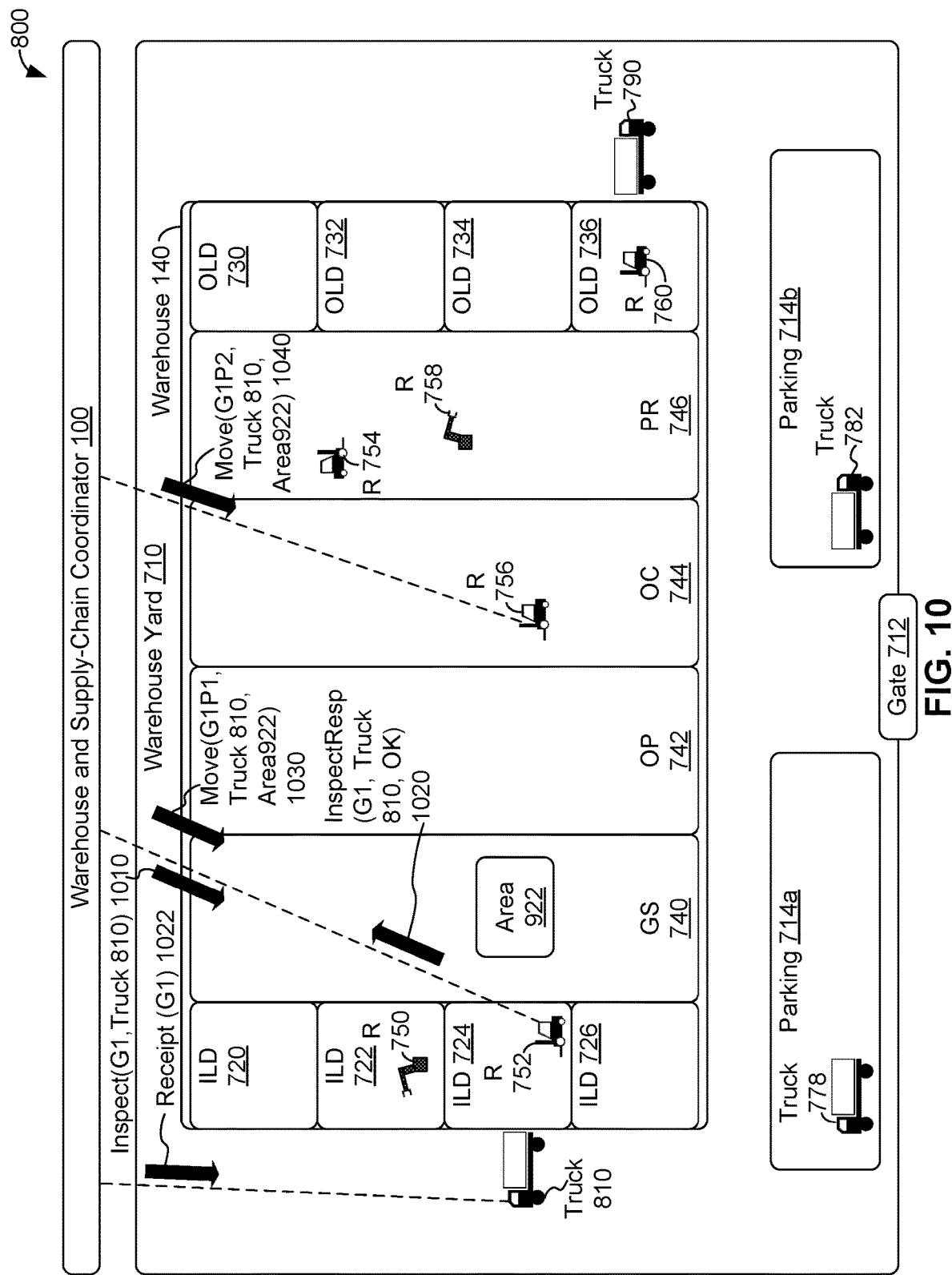

FIG. 10 shows that scenario 800 continues with truck 810 arriving at inbound loading dock 724 at time T1. Warehouse and supply-chain coordinator 100 sends inspect message 1010 to robot 752 to inspect goods G1 on truck 810. Upon reception of inspect message 1010, robot 752 inspects goods G1 to determine their compliance with a contract for the goods G1. In scenario 800, goods G1 aboard truck 810 are compliant with the contract, and so robot 752 sends inspect response (InspectResp) message 1020 indicating goods G1 are compliant "OK" with the contract. To inspect goods G1, robot 752 can visually inspect goods G1, scan text, bar codes, Radio Frequency ID (RFID), and/or Quick Response (QR) codes on and/or associated with goods G1, provide a video and/or audio information related to goods G1 on truck 810 for inspection by another entity, such a warehouse and supply-chain coordinator 100 and/or a human inspector, physically examine goods G1 using one or more actuators and/or sensors, and/or use other reasonable techniques to inspect goods G1. As goods G1 are compliant with the contract, warehouse and supply-chain coordinator 100 sends receipt 1022 to truck 810 for goods G1 to indicate acceptance of goods G1 from truck 810 at warehouse 140.

In other scenarios, goods G1 are not compliant with the contract—in those scenarios, the inspect response message indicates that goods G1 are "NOT OK" or non-compliant with the contract. In these scenarios, warehouse and supply-chain coordinator 100 sends a rejection message rejecting goods G1 rather than a receipt 1022 for goods G1. Also in these other scenarios, at least the rejected goods G1 are not unloaded from truck 810.

In scenario 800, goods G1 are loaded on to two pallets—G1P1 and G1P2. After the successful inspection of goods G1, warehouse and supply-chain coordinator 100 sends move message 1030 to robot 752 to move pallet "G1P1" from truck 810 to area 922, and sends move message 1040 to robot 756 to move pallet "G1P2" from truck 810 to area 922. Once pallets G1P1 and G1P2 have been unloaded, truck 810 pulls away from incoming loading dock 724 and leaves warehouse yard 710 via gate 712.

Figure 11:
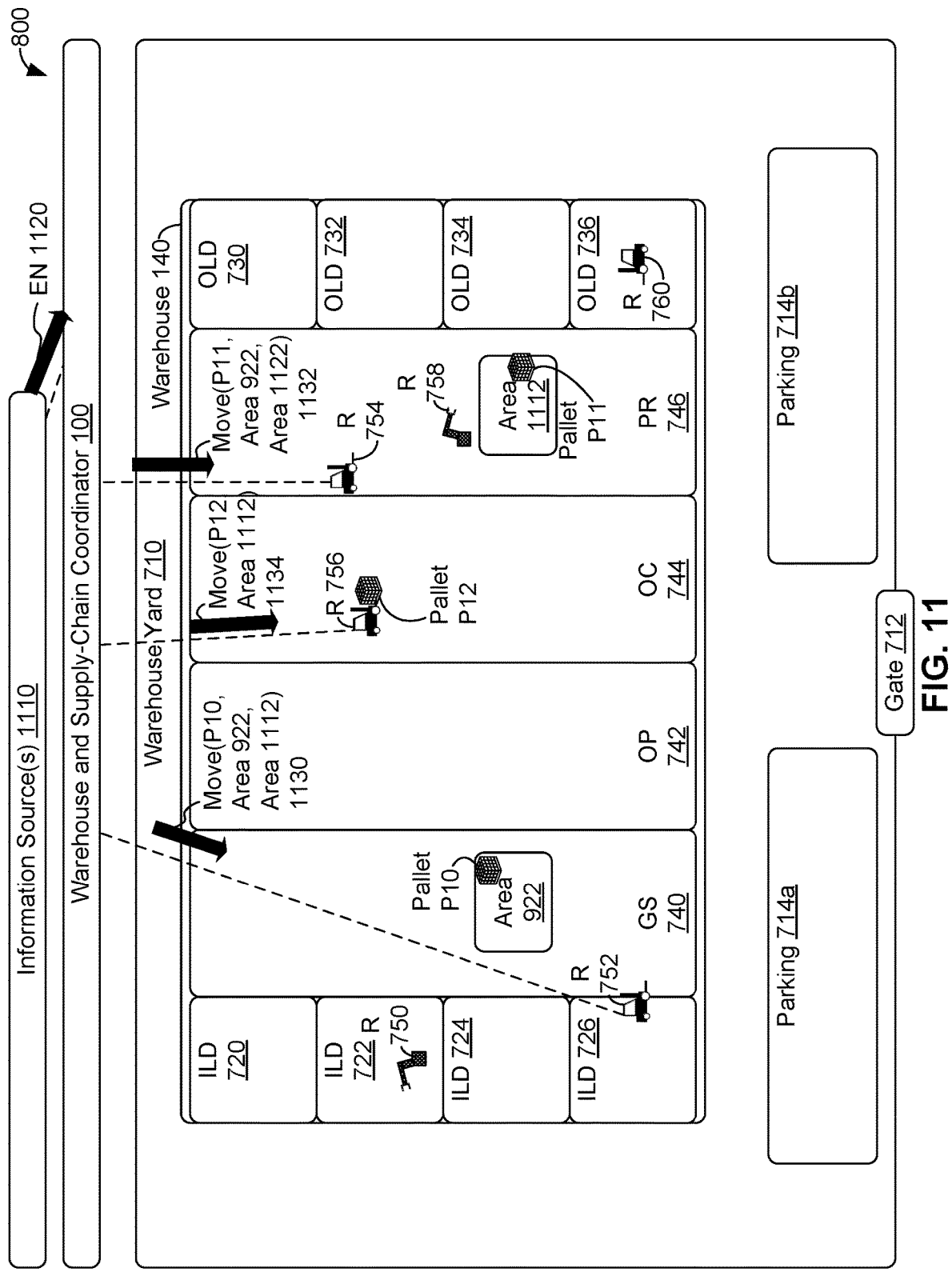

Scenario 800 continues, as shown in FIG. 11, with one or more information sources 1110 providing event notification 1120 to warehouse and supply-chain coordinator 100. In scenario 800, event notification 1120 causes warehouse and supply-chain coordinator 100 to "re-slot" or move within warehouse 140 three pallets: P10, P11, and P12. In scenario 800, event notification 1120 includes information about a weather related event, and goods in pallets P10, P11, and P12 can be used to address concerns with the weather related event; e.g., sun screen for a hot weather event, snow shovels for a winter storm event. Other types of events and related event information are possible, such as discussed above at least in the context of FIG. 3.

In response to event notification 1120, warehouse and supply-chain coordinator 100 re-slots pallets P10, P11, and P12 to area 1112 within packing region 746; i.e., makes pallets P10, P11, and P12 more readily available for shipment after re-slotting. In scenario 800, re-slotting occurs when warehouse 140 is not loading or unloading goods at loading docks 720, 722, 724, 726, 730, 732, 734, 736; in other scenarios, re-slotting occurs while goods are being loaded and/or unloaded at warehouse 140. In additional other scenarios, re-slotting occurs based on available storage within warehouse 140 (e.g., re-slot from relatively-full areas to relatively-empty areas of warehouse 140), based on expected vehicle arrivals/departures and/or shipments of goods, one or more velocities of goods, based on a re-slotting list of pallets maintained by warehouse and supply-chain coordinator 100, and/or for other reasons.

In still other scenarios, re-slotting involves re-slotting during robot "deadhead" time; e.g., if robot is instructed to take a pallet to a loading dock and return to a location L within warehouse 140, then the robot can return to location L (or another location) within warehouse 140 with a pallet being re-slotted rather than returning to location L empty/deadheaded (that is, not carrying anything back to location L). Other types of deadhead time; e.g., when the robot is not assigned to carry out a task, can be utilized for re-slotting as well.

To re-slot pallets P10, P11, and P12 to area 1112, warehouse and supply-chain coordinator 100 sends respective move messages 1130, 1132, 1134 to robots 752, 754, 756 to move all three of respective pallets P10, P11, and P12 to area 1112.

Figure 12:
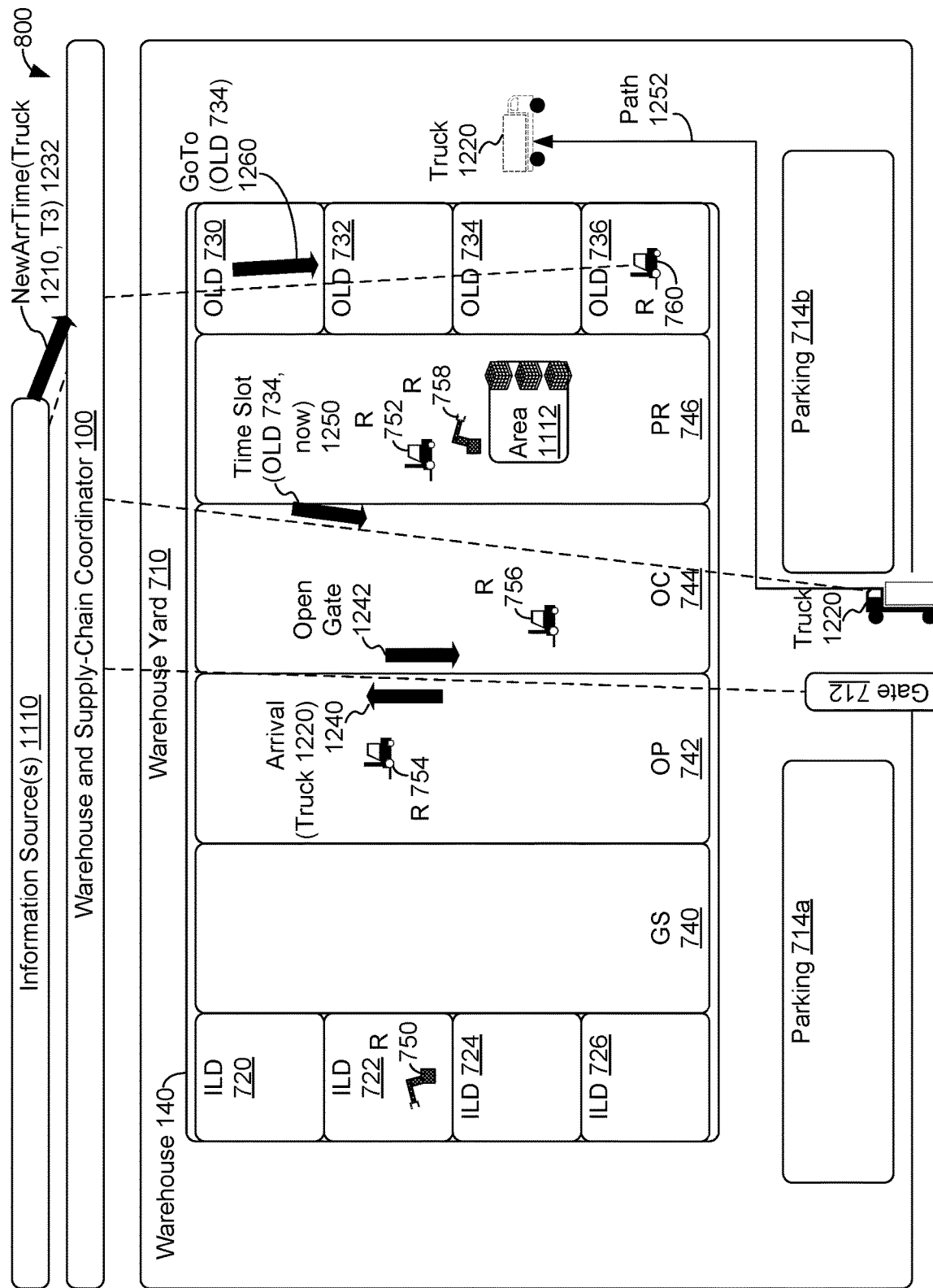

In scenario 800, trucks 1210, 1220, 1230 are expected to be the next three vehicles to arrive at warehouse 140 in that order. FIG. 12 shows that scenario 800 continues with information source(s) 1110 sending new arrival time ("NewArrTime") message 1232 informing warehouse and supply-chain coordinator 100 that truck 1210 has been delayed and is now expected to arrive at time T3 in the future.

FIG. 12 also shows truck 1220 arriving at gate 712 of warehouse yard 710. Gate 712 sends arrival message 1240 informing warehouse and supply-chain coordinator 100 that truck 1220 has arrived at gate 712. In response to arrival message 1240, warehouse and supply-chain coordinator 100 sends open gate message 1242 instructing gate 712 to open, thereby allowing truck 1220 access to warehouse yard 710. Warehouse and supply-chain coordinator 100 allocates a time slot starting immediately at outbound loading dock 734 and sends time slot message 1250 informing truck 1220 that it has a time slot at outbound loading dock 734 starting "now", in response to time slot message 1250, truck 1220 starts along path 1252 toward outbound loading dock 734. In preparation of the arrival of truck 1220 at outbound loading dock 734, warehouse and supply-chain coordinator 100 sends GoTo message 1260 directing robot 760 to travel toward outbound loading dock 734.

In some scenarios, the time slot at outbound loading dock 734 is previously allocated to truck 1210, as truck 1210 is expected to be a next arriving vehicle at outbound loading dock 734. For example, if vehicle loading and/or unloading is not performed at warehouse 140 during a "no-load" interval, such as during an overnight shift, then a timeslot for a first arriving vehicle after the no-load interval can be previously allocated by warehouse and supply-chain coordinator 100. In these scenarios, the time slot at outbound loading dock 734 to truck 1210 can be released before the time slot is allocated to truck 1220, as discussed above regarding time slot message 1250.

Figure 13:
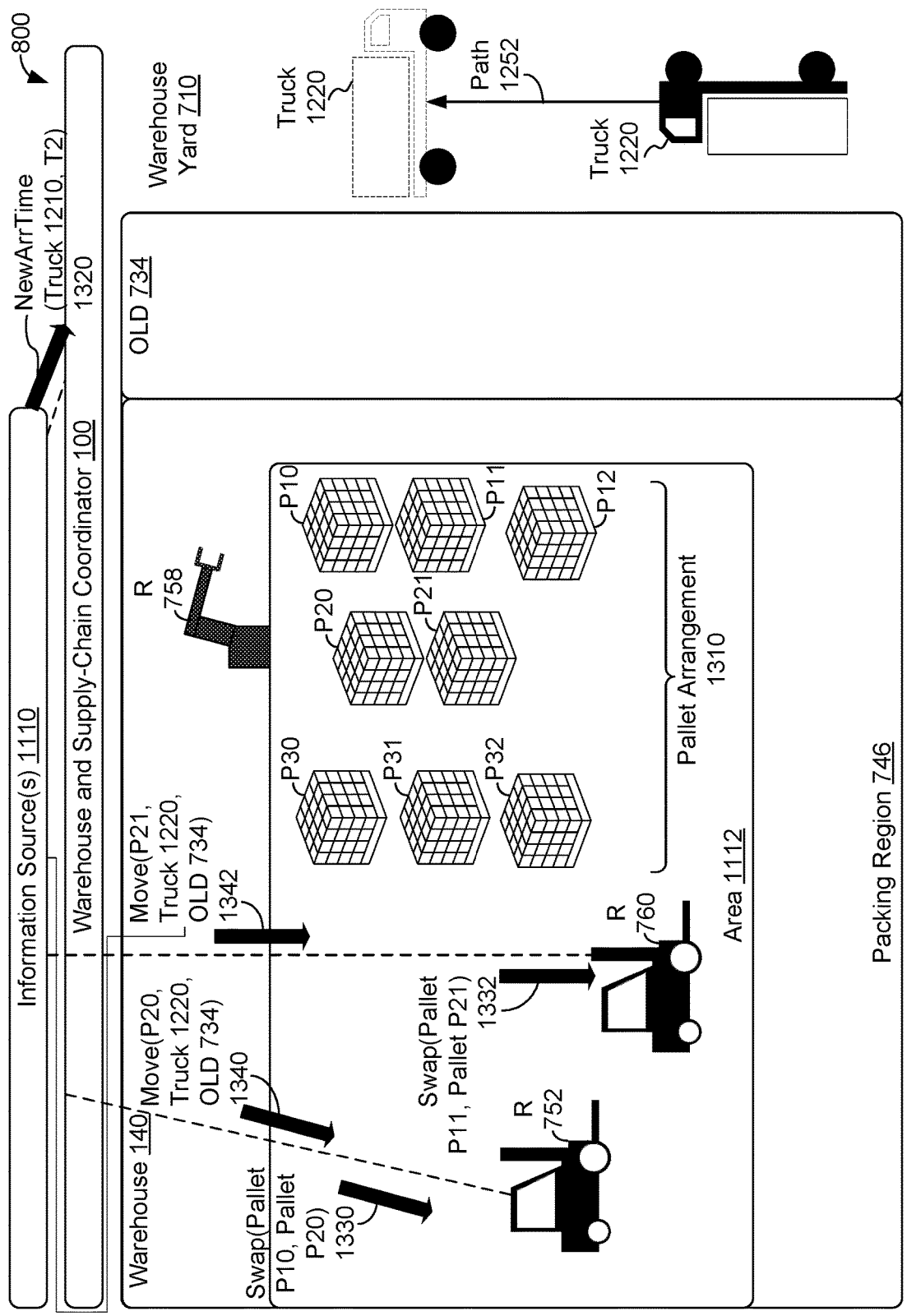

FIG. 13 shows a portion of warehouse 140 that includes outbound loading dock 734, packing region 746, and all of area 1112, as well as a portion of warehouse yard 710 near outbound loading dock 734. Scenario 800 continues with truck 1220 continuing on path 1252 toward outbound loading dock 734. Warehouse and supply-chain coordinator 100 determines to rearrange pallet arrangement 1310 as much as possible before truck 1220 arrives at outbound loading dock 734.

FIG. 13 shows that pallet arrangement 1310 has three columns of pallets: a first column of pallets P10, P11, and P12 destined for loading onto truck 1210, a second column of pallets P20 and P21 destined for loading onto truck 1220, and a third column of pallets P30, P31, and P32 destined for loading onto truck 1230, where the first column of pallets is closer to outbound loading dock 734 that the second column of pallets, which in turn is closer to outbound loading dock 734 that the third column of pallets. Pallet arrangement 1310 is so organized to enable faster loading for truck 1210, which was expected to be the next truck arriving at outbound loading dock 734; i.e., the first column of pallets are both destined for loading onto truck 1210 and are closest to outbound loading dock 734. But, as mentioned above, truck 1210 has been delayed and truck 1220 is now the next truck arriving outbound loading dock 734. In some examples, each column of pallets can be considered to be a queue entry of a pallet arrangement, where such queue entries are discussed below at least in the context of FIGS. 17-22.

To help speed loading of truck 1220, warehouse and supply-chain coordinator 100 determines to swap the first and second columns of pallets, thus placing pallets P20 and P21 destined for truck 1220 closer to outbound loading dock 734 for faster loading onto truck 1220. In scenario 800, though, there is not enough time to fully swap the first and second columns of pallets before truck 1220 arrives and parks at outbound loading dock 734. So, warehouse and supply-chain coordinator 100 sends swap message 1330 to robot 752 to swap pallets P10 and P20, and sends swap message 1332 to robot 760 to swap pallets P11 and P21, thus moving the two pallets destined for truck 1220 (P20 and P21) closer to outbound loading dock 734, while pallet P12 destined for truck 1210 remains in the first column of pallet arrangement 1310.

Scenario 800 continues with truck 1220 arriving at outbound loading dock 734. After truck 1220 arrives at outbound loading dock 734, warehouse and supply-chain coordinator 100 instructs robots 752 and 760 to load truck 1220. In particular, warehouse and supply-chain coordinator 100 sends move message 1340 to robot 752 to move pallet "P20" to "Truck 1220" that is loaded at "OLD" (outbound loading dock) "734", and sends move message 1342 to robot 752 to move pallet "P21" to "Truck 1220" that is loaded at "OLD 734". In other scenarios, rather than swapping pallets, robots 752 and 760 load truck 1220 with pallets P20 and P21 that are initially in the second column of pallet arrangement 1310.

Figure 14:
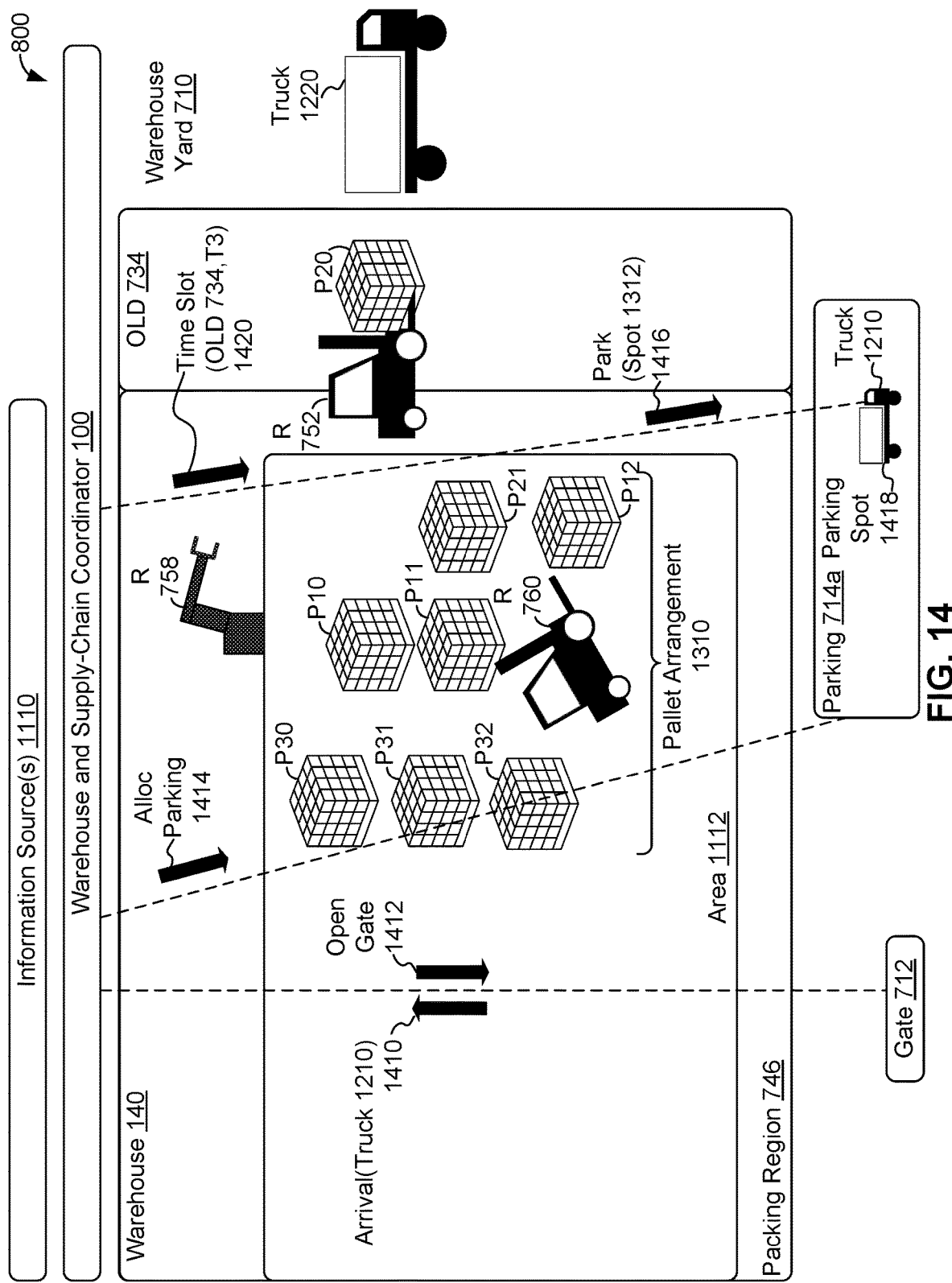

FIG. 14 shows robots 752 and 760 loading respective pallets P20 and P21 onto truck 1220. While truck 1220 is being loaded, truck 1210 arrives at gate 712. Gate 712 sends arrival message 1410 informing warehouse and supply-chain coordinator 100 of the arrival of truck 1210. In response to arrival message 1410, warehouse and supply-chain coordinator 100 instructs gate 712 to open via open gate message 1412, thereby permitting truck 1210 to enter warehouse yard 710.

Warehouse and supply-chain coordinator 100 determines that truck 1210 has to park and wait until truck 1220 is loaded before proceeding to outgoing loading dock 734 and so allocates parking spot 1418 for truck 1210 as indicated by allocate parking message 1414. Warehouse and supply-chain coordinator 100 sends park message 1416 to inform truck 1210 to park at parking spot 1418. Warehouse and supply-chain coordinator 100 then allocates a time slot at outgoing loading dock 734 starting at time T3 to truck 1210 and sends time slot message 1420 to inform truck 1210 about the allocated time slot.

Figure 15:
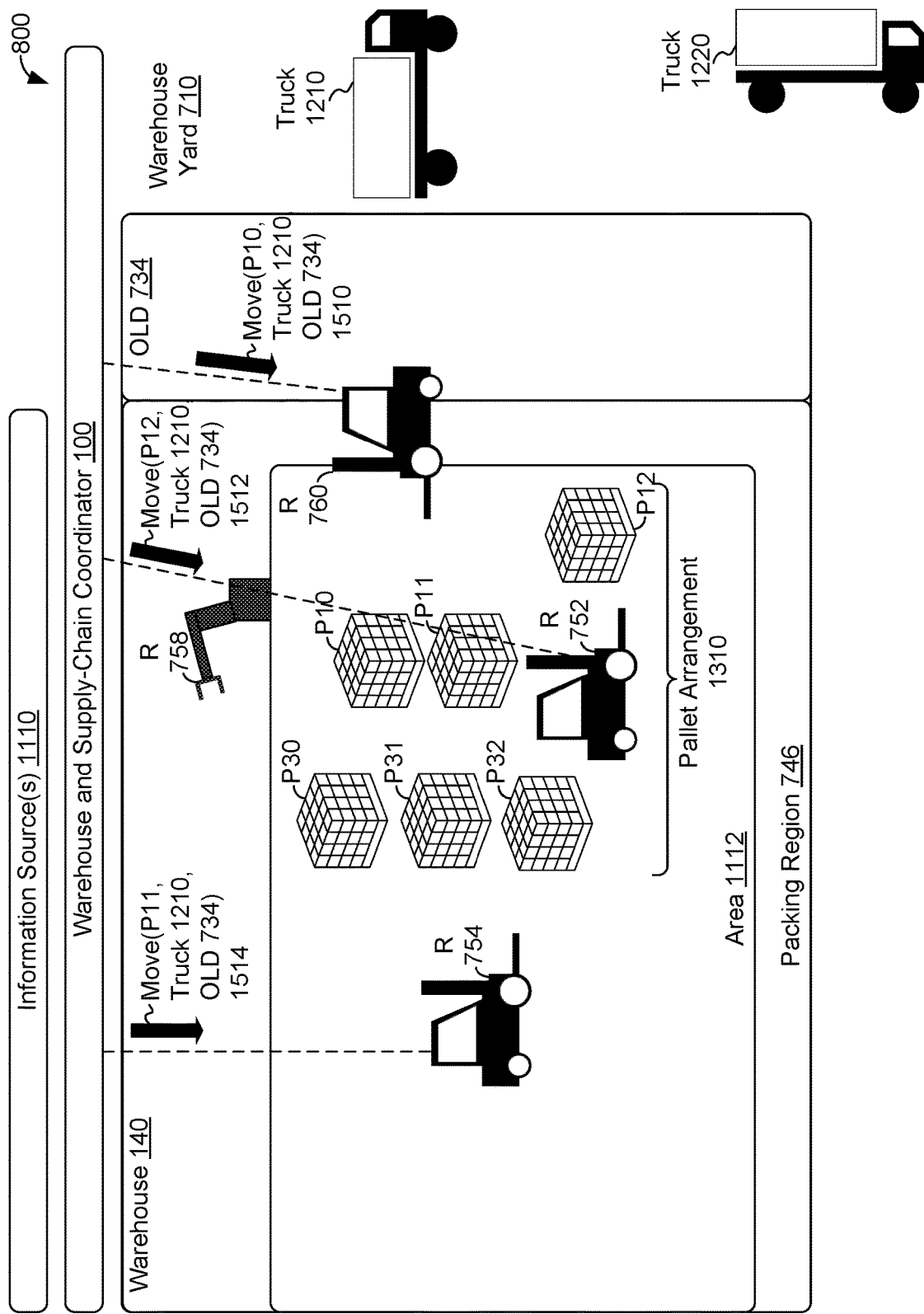

Scenario 800 continues with robots 752 and 760 finishing loading of pallets P20 and P21 onto truck 1220, and the subsequent departure of truck 1220, as shown in FIG. 15. Then, time T3 arrives and truck 1210 drives from parking spot 1418 to outgoing loading dock 734. Upon arrival of truck 1210 at outgoing loading dock 734, warehouse and supply-chain coordinator 100 directs robots 752, 754, and 756 to load truck 1210. More specifically, warehouse and supply-chain coordinator 100 sends respective move messages 1510, 1512, and 1514 to respective robots 760, 752, and 754 to move respective pallets "P10", "P11", and "P12" onto "Truck 1210" at "OLD 734". After truck 1210 is loaded, truck 1210 departs from outgoing loading dock 734.

Figure 16:
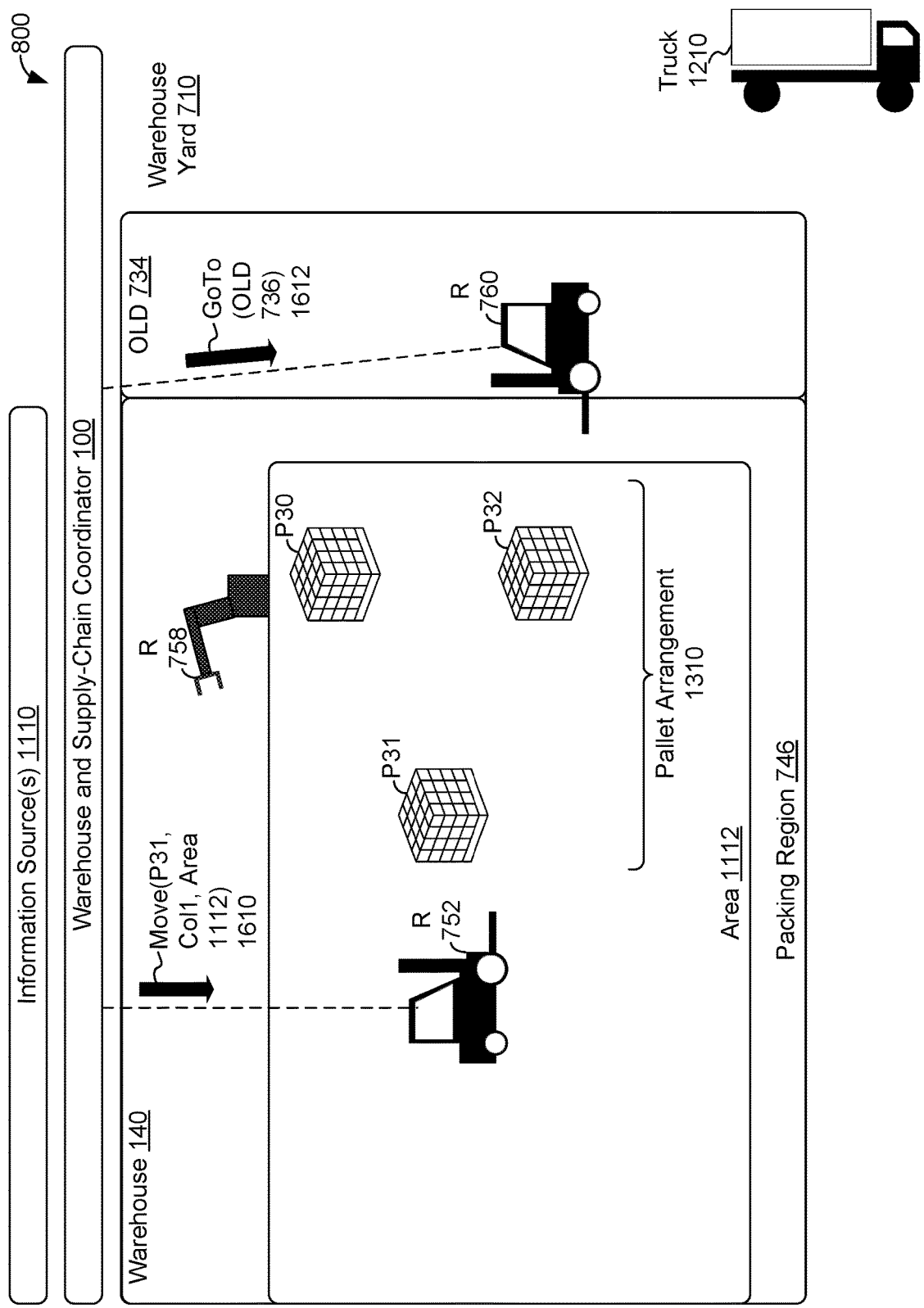

FIG. 16 shows scenario 800 continuing with truck 1210 on its way from outgoing loading dock 734. FIG. 16 also shows the first column of pallet arrangement 1310 with two pallets P30 and P32. Warehouse and supply-chain coordinator 100 sends move message 1610 to direct robot 752 to move pallet P31 to the first column "Col1" of pallet arrangement 1310 in "Area 1112", After robot 752 has moved pallet P31 to the first column of pallet arrangement 1310, the first column has all three pallets—P30, P31, and P32—destined for truck 1230, which is the next arriving truck at outgoing loading dock 734. Warehouse and supply-chain coordinator 100 also sends GoTo message 1612 instructing robot 760 to move to outgoing loading dock 736. Once pallet P31 has been moved to the first column of pallet arrangement 1310 and robot 760 has moved to outgoing loading dock 736, scenario 800 can be completed.

Figure 17:
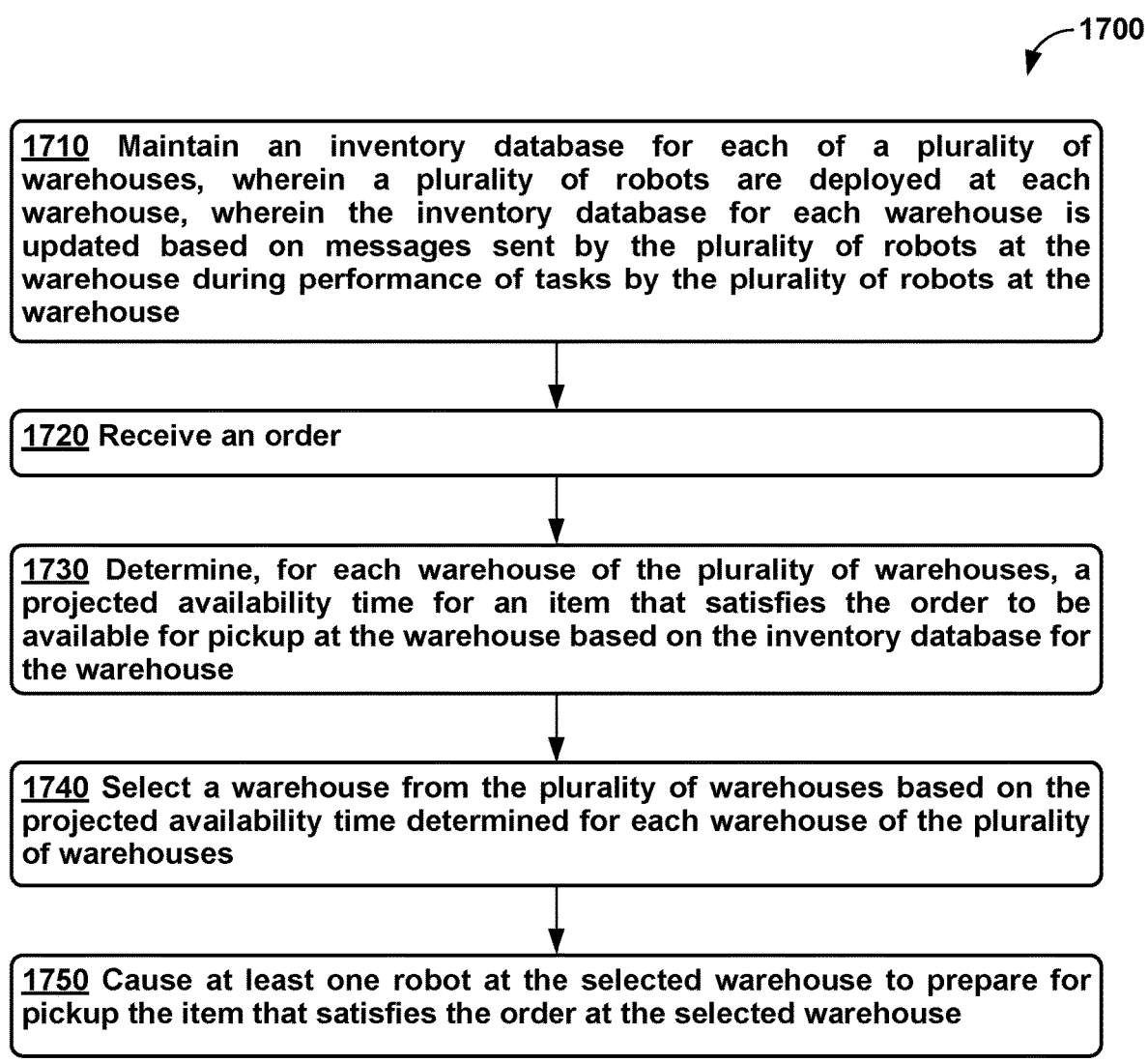
FIG. 17 is a block diagram of a method, in accordance with an example embodiment.
Figure 18:
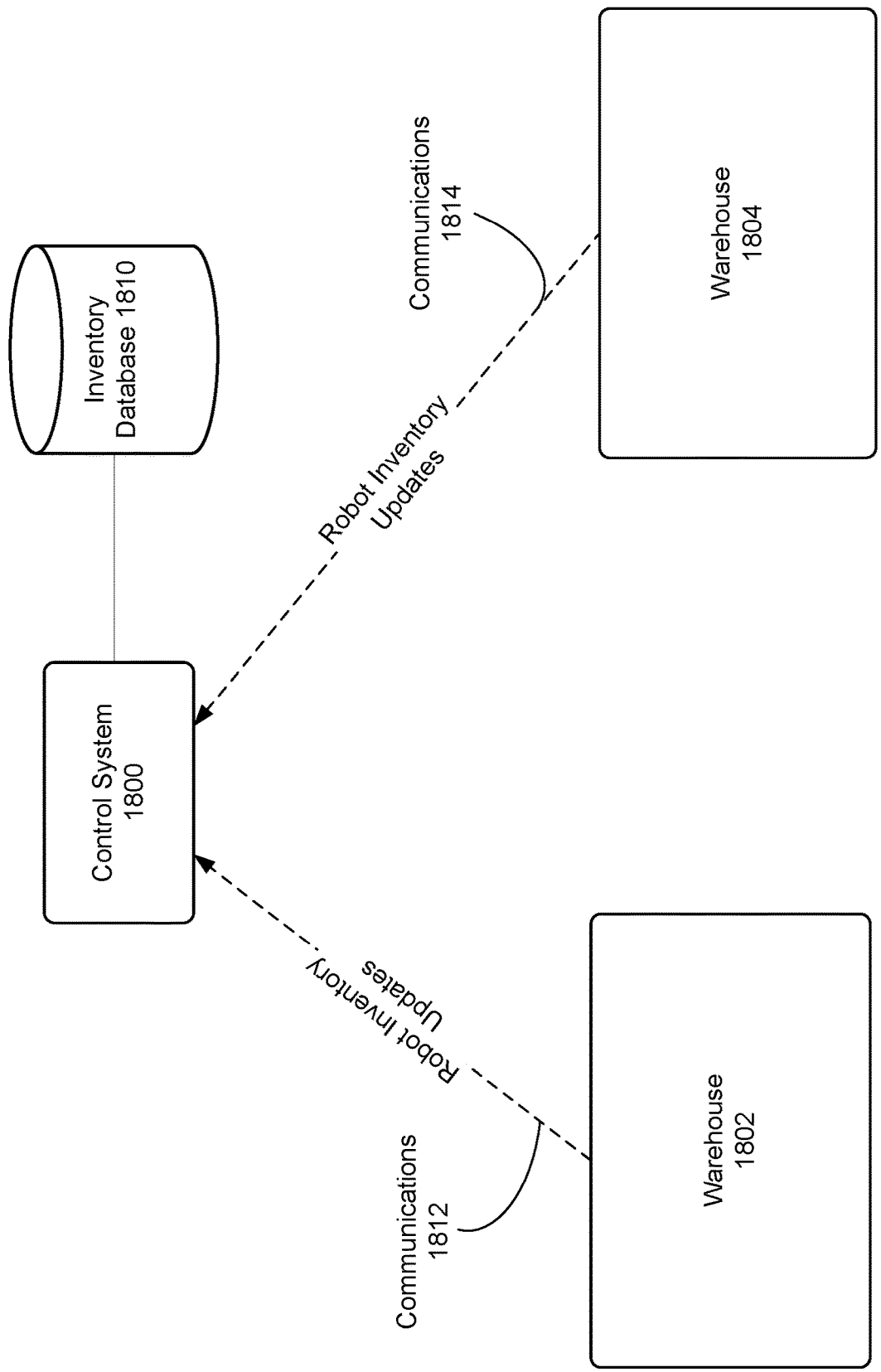
FIGS. 18, 19, 20, and 21 illustrate a scenario where an order is routed to a selected warehouse, in accordance with an example embodiment.

FIG. 17 is a block diagram of method 1700, in accordance with an example embodiment. In some examples, method 1700 can be performed by an order management system (OMS). The OMS may be a part of warehouse and supply-chain coordinator 100. More specifically, method 1700 can be included in one or more computer-readable instructions that, when executed by one or more processors of a computing device, cause the computing device to perform some or all of the functions of method 1700 while performing herein-described features of warehouse and supply-chain coordinator 100. In other examples, method 1700 can be performed by one or more other entities other than warehouse and supply-chain coordinator 100.

Those skilled in the art will understand that the block diagram of FIG. 17 illustrates functionality and operation of certain implementations of the present disclosure. In this regard, each block of the block diagram may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 1710, method 1700 includes maintaining an inventory database for each of a plurality of warehouses. A group of robots may be deployed in each warehouse to perform operations related to managing inventory at the facility. The inventory database for each warehouse contains inventory information that is updated based on messages sent by the robots during performance of tasks by the robots at the warehouse. In some examples, a remote inventory database may be maintained by a remote server (e.g., a cloud-based server) that is remote from each of the warehouses. In other examples, a local portion of the inventory database may be maintained at each warehouse (e.g., by a WMS at the warehouse). Regardless of how the database is stored, the inventory information for each warehouse may be updated in real-time or near real-time in response to inventory management operations performed by robots at the warehouse based on electronic (e.g., wireless) messages sent by the robots.

FIGS. 18, 19, 20, and 21 illustrate a scenario where an order is routed to a selected warehouse, in accordance with an example embodiment. In reference to FIG. 18, control system 1800 includes one or more computing devices configured to coordinate operation across a network of warehouses. In some examples, control system 1800 may be an example of warehouse and supply-chain coordinator 100 described in reference to FIG. 1. Control system 1800 may include an OMS that is remote from warehouse 1802 and warehouse 1804. Control system 1800 may maintain inventory database 1810, which is also remote from warehouse 1802 and warehouse 1804. Control system 1800 may be communicatively coupled to a WMS at each warehouse

1802, 1804 via a wireless connection. Control system 1800 may also be communicatively coupled to individual robots at each warehouse 1802, 1804 via a wireless connection as well or instead. In still other examples, control system 1800 and/or inventory database 1810 may be distributed across two or more robotic devices, such that a peer-to-peer network of robotic devices including a computing system is formed.

In order to keep current the information in inventory database 1820 regarding available inventory at each of warehouse 1802 and warehouse 1804, control system 1800 may receive robot inventory updates from warehouse 1802 via communications 1812 and from warehouse 1804 via communications 1814. More specifically, communications 1812 may be wireless messages transmitted by a WMS at warehouse 1802 and/or directly by robots at warehouse 1802. Similarly, communications 1814 may be wireless messages transmitted by a VMS at warehouse 1804 and/or directly by robots at warehouse 1804.

In some examples, one of communications 1812 may be received from warehouse 1802 each time a robot at warehouse 1802 processes an incoming or outgoing item. For instance, the robot may be configured to scan an on-item identifier (e.g., a barcode) on each such item at a loading dock of warehouse 1802 when the item is unloaded from a delivery truck or loaded onto a delivery truck. In response to the scan, the robot may send a message to control system 1800 to update the currently available inventory at warehouse 1802 that is maintained in inventory database 1810. In some examples, instead of relying on a scan, inventory updates may be inferred based on data from other robot sensors (e.g., camera image data may be processed to determine that a pallet includes a particular type and quantity of an item). By relying on robot inventory updates, the inventory database 1810 may allow for better visibility into inventory across a network of warehouses for control system 1800 to make order routing decisions.

In further examples, inventory database 1810 may additionally store physical positions of inventory within each warehouse 1802, 1804. The positions may be updated based on communications 1812, 1814 from each warehouse 1802, 1804. Inventory database 1810 may also store metrology information of inventory within each warehouse 1802, 1804. The metrology information may also be updated based on communications 1812, 1814 from each warehouse 1802, 1804.

In some examples, each warehouse 1802, 1804 may be a fulfillment warehouse in which items are selected, sorted, and packaged for shipment to customers. Items may be arranged or organized within each warehouse 1802, 1804 to improve efficiency of this process based on customer demand, product size, weight, shape, or other characteristics. Inventory objects may be stored on pallets, which may be stacked on top of each other and/or on storage racks that extend upwards (e.g., multilevel shelving) at storage locations within each warehouse 1802, 1804.

Further, each item and storage location may include a barcode or other identifier that identifies the item and storage location, respectively. An identifier that identifies a storage location may be referred to as a storage location identifier and an identifier that identifies an inventory item may be referred to as an on-item identifier. Similarly, a barcode that identifies a storage location may be referred to as a storage-location barcode and a barcode that identifies an inventory item may be referred to as an on-item barcode. The storage-location barcodes and on-item barcodes can be one-dimensional barcodes (i.e., a linear barcode) and/or two-dimensional barcodes (i.e., a matrix barcode). One example of a two-dimensional barcode is a QR code.

The inventory database 1810 can store information related to the items and/or storage locations, as well as one or more robotic devices operating in each warehouse 1802, 1804. For instance, the inventory database 1810 can include information about the location within each warehouse 1802, 1804 of each item, storage location, and/or robotic device. This information may be used to coordinate the robotic devices to allow them to carry out one or more functions, such as fulfilling an order for a customer. It may also be used to track an inventory of items in each warehouse 1802, 1801.

In some examples, the inventory database 1810 may specify for each storage location in each warehouse 1802, 1804, on a per storage location basis, a record of associated data entries for different items, barcodes, and/or physical warehouse locations. For instance, each record can be a row in a table having columns for fields that include indications of the storage-location barcode of the storage location, the on-item barcode(s) of the item(s) stored at the storage location, and the physical location of the storage location in warehouse 1802 or 1804. The physical location of the storage location in warehouse 1802 or 1804 can be represented by, for example, coordinates of the storage location on a coordinate system spatially mapped to the physical space of the warehouse. Thus, with knowledge of a storage-location barcode and/or an on-item barcode, a record in inventory database 1810 can be used to determine a physical location in the warehouse.

In line with the discussion above, the data stored in inventory database 1810 can be, at least in part, based on inventory tracking operations carried out by robotic devices at each warehouse 1802, 1804. For example, when an item is deposited at or removed from a particular storage location, a robotic device can scan the storage-location barcode at the storage location and the on-item barcode on the item. The robotic device can then transmit the storage-location barcode and the on-item barcode to the control system 1800, which updates the inventory database 1810 to indicate that the item was deposited at or removed from the storage location. In this way, storage-location barcodes and on-item barcodes may be used to facilitate tracking the inventory of items within each warehouse 1802, 1804. In additional examples, physical scanning of the storage-location barcode may not be performed. Instead, a robot may simply message the WMS at the warehouse or the inventory database 1810 with a digital (e.g., wireless) message that includes the barcode string as a location identifier.

Referring back to FIG. 17, method 1700 further includes receiving an order, as shown by block 1720. An order is a request for shipment of one or more items, Each requested item may be identified by a SKU, an identification code (often a barcode) that helps track the item for inventory. In some examples, the order may include requests for one or more types of items, such that multiple different SKUs may satisfy the request. In some examples, the order may be received from a software application running on a user device. The order may be received by an OMS or other order routing system.

Figure 19:
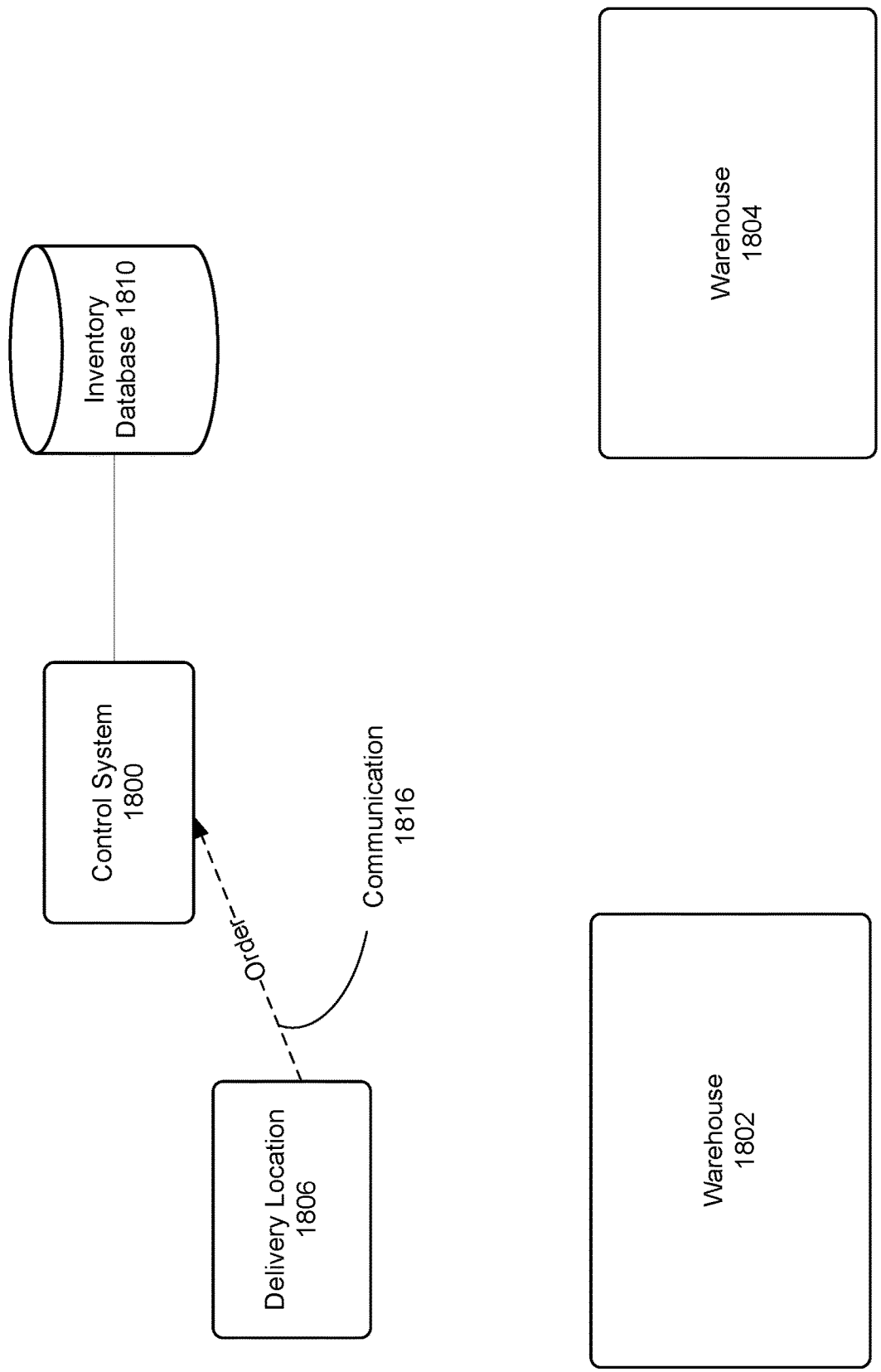

In reference to FIG. 19, an order may be received by control system 1800 from delivery location 1806 via wireless communication 1816. Based on the proximity of delivery location 1806 to warehouse 1802 and warehouse 1804, control system 1800 may consider warehouse 1802 and warehouse 1804 as possible facilities to route the received order from delivery location 1806. In order to make a determination regarding which warehouse(s) to send the order or portions of the order, control system 1800 may reference inventory database 1810.

Referring back to FIG. 17, method 1700 further includes determining, for each warehouse of the plurality of warehouses, a projected availability time for an item that satisfies the order to be available for pickup at the warehouse. The projected availability time for each warehouse is a time at which the item is expected to be ready for pickup by a delivery vehicle at the warehouse. In some examples, the projected availability time may be a window of time during which the item can be made available for pickup at the warehouse. In further examples, one or more robots at a warehouse make an item available for pickup by moving the item to a loading dock (or the end of a loading dock) at the warehouse.

The projected availability time for each warehouse may be determined at least in part based on the inventory database. In particular, the inventory database may contain real-time or near-real time information about currently available inventory at each warehouse. This information may be used to ensure that each warehouse has or will have an available item to satisfy the order by the projected availability time determined for each warehouse. In further examples, inventory location information from the inventory database indicating physical locations of inventory at a warehouse may also be used to determine the projected availability time. In additional examples, inventory metrology information from the inventory database indicating robot-measured metrics of inventory at a warehouse may also be used to determine the projected availability time.

In further examples, a software simulation may be run by a control system to determine a projected availability time for inventory at the warehouse. The software simulation may take into the current position of the requested item at the warehouse. A software simulation may account for variance in the amount of time it takes robots to perform tasks needed to prepare the item for shipment. For instance, the average preparation time across a range of previously performed similar tasks may be used to predict the projected availability time. In some examples, the software simulation may use a machine learning model for the prediction. In further examples, a number of robots that will be available to prepare the item for pickup and/or load the item onto a delivery vehicle may be predicted and used to generate the projected availability time.

In further examples, scheduling information for robots at each automated facility may also be used to determine the projected availability time for the automated facility. The scheduling information for a warehouse may include future tasks assigned to the fleet of robots at a warehouse and/or to individual robots at the warehouse. A control system may then determine the projected availability time by identifying one or more robots at the warehouse that are expected to be available to prepare the item for pickup by the projected availability time. A software simulation may also take into account robot position information and/or robot task assignment information in determining a projected availability time.

Figure 20:
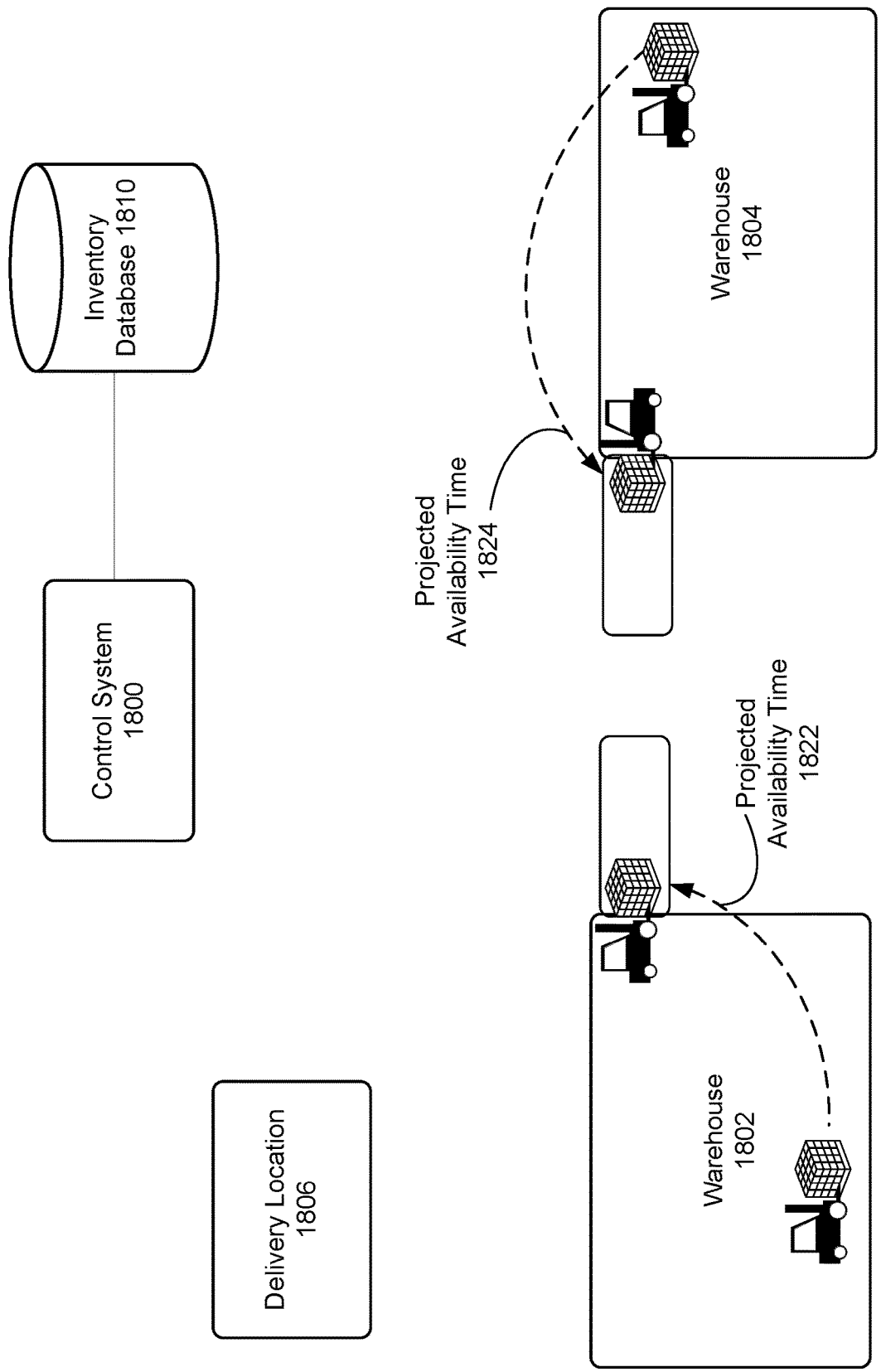

In reference to FIG. 20, control system 1800 may use information in inventory database 1810 to determine projected availability time 1822 for warehouse 1802 and projected availability time 1824 for warehouse 1804. In this example, projected availability time 1822 is a time by which at least one robot at warehouse 1802 is expected to be able to move an item that satisfies the order to a loading dock at warehouse 1802. Similarly, projected availability time 1824 is a time by which at least one robot at warehouse 1804 is expected to be able to move an item that satisfies the order to a loading dock at warehouse 1804.

Projected availability time 1822 and projected availability time 1824 may be determined using inventory information from inventory database 1810. The inventory information may include information about what inventory is currently available at each warehouse 1802, 1804. The inventory information may also include physical locations of inventory at each warehouse 1802, 1804 and/or metrology information for inventory at each warehouse 1802, 1804.

In further examples, projected availability time 1822 and projected availability time 1824 may be determined based on robot position and/or scheduling information at each warehouse 1802, 1804. In some examples, the robot position and/or scheduling information may also be stored in inventory database 1810 and/or in a different database accessible by control system 1800.

In additional examples, a projected availability time may be determined for a facility that does not currently have the requested item. The projected availability time may then be based on an expected arrival time at which the item is expected to be delivered to the warehouse by a delivery vehicle. Inventory information and/or robot scheduling information for one or more other automated facilities in a supply chain that are expected to supply the item to the warehouse may also be factored into the projected availability time.

Referring back to FIG. 17, method 1700 may further involve selecting a warehouse from the plurality of warehouse based on the projected availability time determined for each warehouse, as shown by block 1740. In some examples, the warehouse with the earliest projected availability time may be selected to receive the order. In further examples, an expected arrival time for a delivery vehicle from a fleet of delivery vehicles to reach each warehouse after the projected availability time for the warehouse may be considered. In particular, a warehouse may only be selected if the projected availability time for an ordered item at the warehouse and the projected arrival time for a delivery vehicle at the warehouse indicate that that item will be delivered by a predetermined deadline.

In some examples, to determine the predicted arrival time of a delivery vehicle at a warehouse, a machine learning model may be used. The model may be trained based on travel times taken by delivery vehicles depending on various factors, including vehicle type, location, specific truck driver, dispatching area, and weather conditions. The model may then take a current set of input data (e.g., vehicle type, driver, location, weather) and produce an estimated ETA. The model may allow for more precise prediction of when a delivery vehicle will arrive to pick up a shipment before a control system makes a decision to route an order to a given warehouse.

In reference to FIG. 20, control system 1800 may determine that projected availability time 1822 is before projected availability time 1824. Accordingly, control system 1800 may select warehouse 1802 to satisfy the order. In one example, control system 1800 may use inventory database 1810 to determine that warehouse 1802 has available inventory to satisfy the order and that warehouse 1804 will not have available inventory to satisfy the order until the following day. In another example, control system 1800 may use inventory database 1810 to determine that both warehouse 1802 and warehouse 1804 have available inventory to satisfy the order, but based on respective positions of the inventory in each warehouse, it will take two extra hours for the inventory to be made available for pickup at warehouse 1804 compared to warehouse 1802. In yet another example, control system 1800 may use inventory database 1810 to determine that neither warehouse 1802 nor warehouse 1804 has available inventory to satisfy the order, but that warehouse 1802 is expected to have the inventory available a day earlier than warehouse 1804 based on data from other automated facilities in the supply chain. In any of these examples, warehouse 1802 may be selected to satisfy the order.

Referring back to FIG. 17, method 1700 may further involve causing at least one robot at the selected warehouse to prepare for pickup the item that satisfies the order at the selected warehouse, as shown by block 1750. More specifically, control instructions may be sent to a WMS and/or one or more robots at the selected warehouse to cause the one or more robots to move the item to a loading dock at the selected warehouse and/or perform other operations to prepare the item for pickup by a delivery vehicle. In some examples, the projected availability time for the item at the selected warehouse may be set as a deadline for the one or more robots to prepare the item for pickup.

Figure 21:
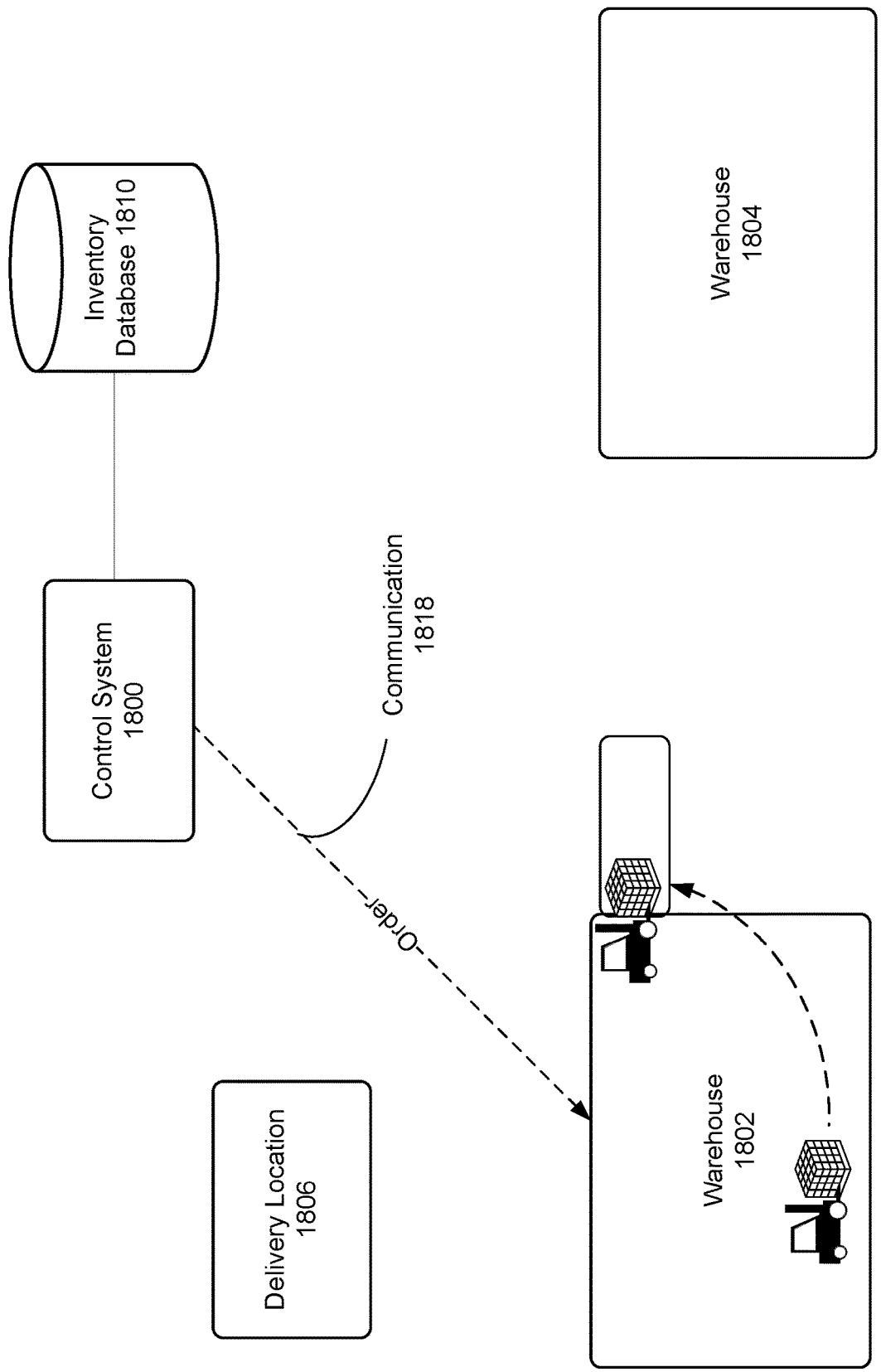

In reference to FIG. 21, after control system 1800 selects warehouse 1802 to fill the order for delivery location 1806, control system may send wireless communication 1818 to warehouse 1802 (e.g., a WMS of warehouse 1802 and/or one or more robots at warehouse 1802). The communication 1818 may include information about the order to enable warehouse 1802 to prepare the requested item for pickup. In particular, a fork truck at warehouse 1802 may be instructed to move a pallet that includes the requested item to a loading dock at warehouse 1802 by the projected availability time determined for warehouse 1802. In some examples, a delivery truck may also be dispatched to warehouse 1802 to pick up the item from the loading dock at an expected arrival time after the projected availability time. The delivery truck may then be instructed to deliver the item to delivery location 1806 to satisfy the order.

In the context of FIGS. 18-21, one or more other types of warehouse robotic devices may be used instead of or in addition to autonomous forklifts at each warehouse in some examples, one or more autonomous guided vehicles (AGVs) may be used that do not include forklifts. In further examples, one or more fixed robotic devices (e.g., robot arms with fixed bases) may also be used. The fleet of robots at a warehouse may also be heterogeneous, including two or more different types of robots to perform different dedicated functions within the warehouse. More generally, the plurality of robots at a warehouse may come in a multitude of different possible form factors.

Figure 22:
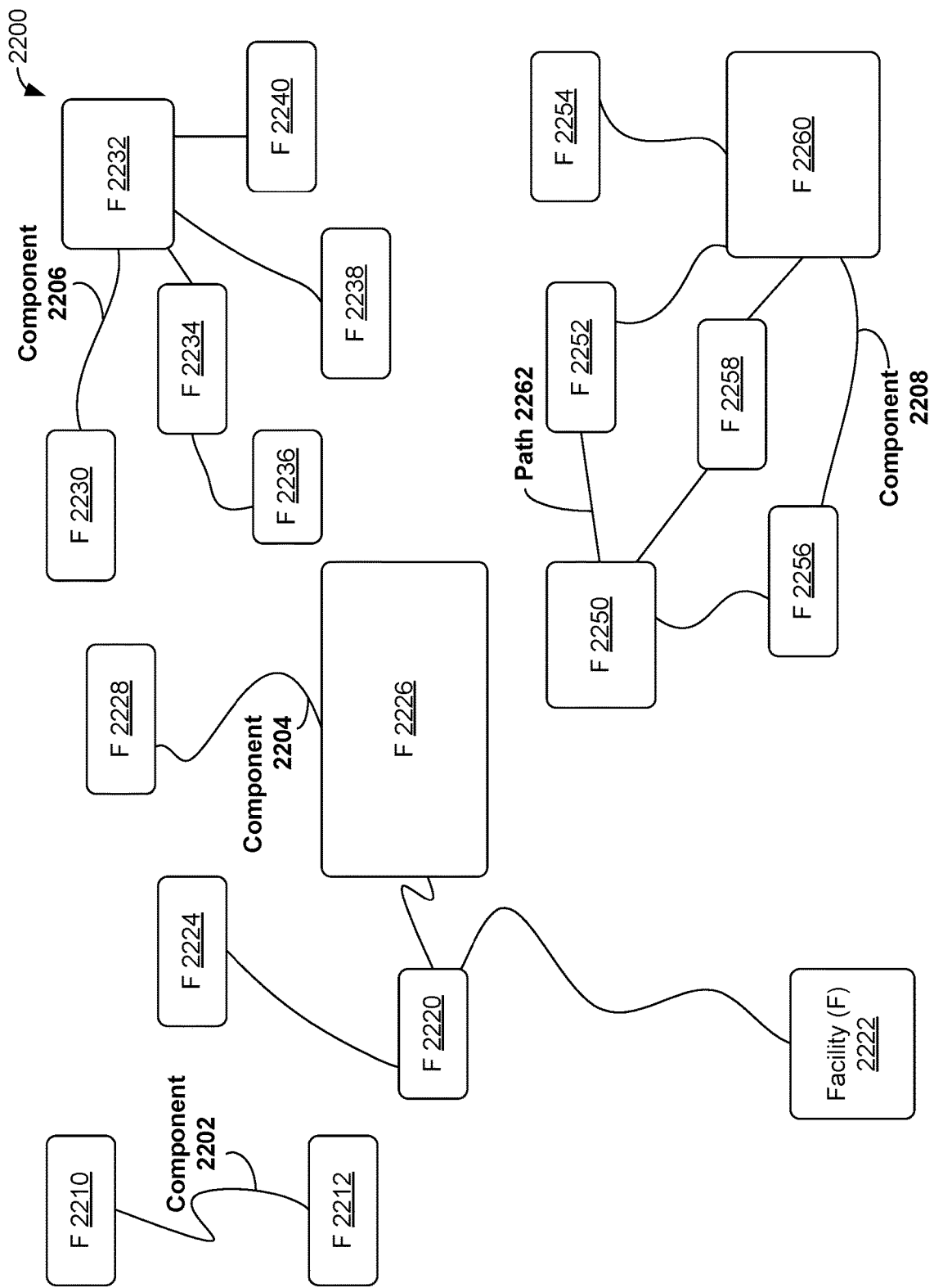
FIG. 22 is a block diagram of another supply chain, in accordance with an example embodiment.

FIG. 22 is a block diagram of supply chain 2200, in accordance with an example embodiment. A supply chain can have one or more components, where a component includes one or more facilities connected by zero or more paths. A facility is an entity of a supply chain that has a fixed location, such as, but not limited to, one or more buildings associated with a supplier, a manufacturer, a warehouse, a distribution center, a maintenance center, and/or a fulfillment center. A relative size of a facility in FIGS. 22-24 indicates a concentration of an inventory of goods and/or a capacity of the facility; e.g., in FIG. 22, a rectangle depicting facility 2232 is larger than a rectangle depicting facility 2234, indicating that facility 2232 has a larger concentration of inventory of goods and/or a capacity than facility 2234. A path between facilities can be used to communicate goods, vehicles, information, and/or other material objects between connected facilities, such as path 2262 that connects facilities 2250 and 2252.

Supply chain 2200 has four disconnected components: component 2202 shown at upper left of FIG. 22 that includes facilities (Fs) 2210 and 2212 connected by one path; component 2204 shown at center left of FIG. 22 that includes facilities 2220, 2222, 2224, 2226, 2228 connected by four paths; component 2206 shown at upper right of FIG. 22 that includes facilities 2230, 2232, 2234, 2236, 2238, 2240 connected by five paths; and component 2208 shown at lower right of FIG. 22 that includes facilities 2250, 2252, 2254, 2256, 2258, 2260 connected by seven paths. In some examples, goods, vehicles, information, and/or other material moving between two facilities in supply chain 2200 has to pass through one or more intermediate facilities; e.g., goods traveling between facility 2230 and facility 2234 have to pass through facility 2232.

In the example supply chain 2200, each of the four components 2202, 2204, 2206, 2208 comprises a separate sub-supply chain, and in the example shown in FIG. 22, the four components are not interconnected. In some examples of supply chain 2200, each component is owned separately; e.g., component 2202 is owned by owner A, component 2204 is owned by owner B, component 2206 is owned by owner C, and component 2208 is owned by owner D, where each of owners A, B, C, and D are different. In other examples of supply chain 2200, some or all components 2202, 2204, 2206, 2208 are co-owned.

As indicated in FIG. 22, the four components 2202, 2204, 2206, 2208 of supply chain 2200 do not directly interconnect. Then, one or more intermediate facilities can be used to ship goods and/or other material between components 2202, 2204, 2206, and 2208; e.g, goods shipped from component 2206 to component 2204 can be routed through facility 2236 of component 2206 and through facility 2226 of component 2204 for shipment to their destination in component 2204.

In other examples, two or more non-intermeshing components send partially-loaded vehicles to the same relatively-small region (e.g., a region having only one zip-code or postal code), leading to inefficient coverage of the relatively-small region. Further, routing goods and/or other material through an intermediate facility can increase costs and time due to loading, unloading, and perhaps extra breakage/spoilage of the goods and/or other material at the intermediate facility. To reduce such inefficiencies related to partial loads and intermediate facilities, part or all of various components of a supply chain can be consolidated.

Figure 23:
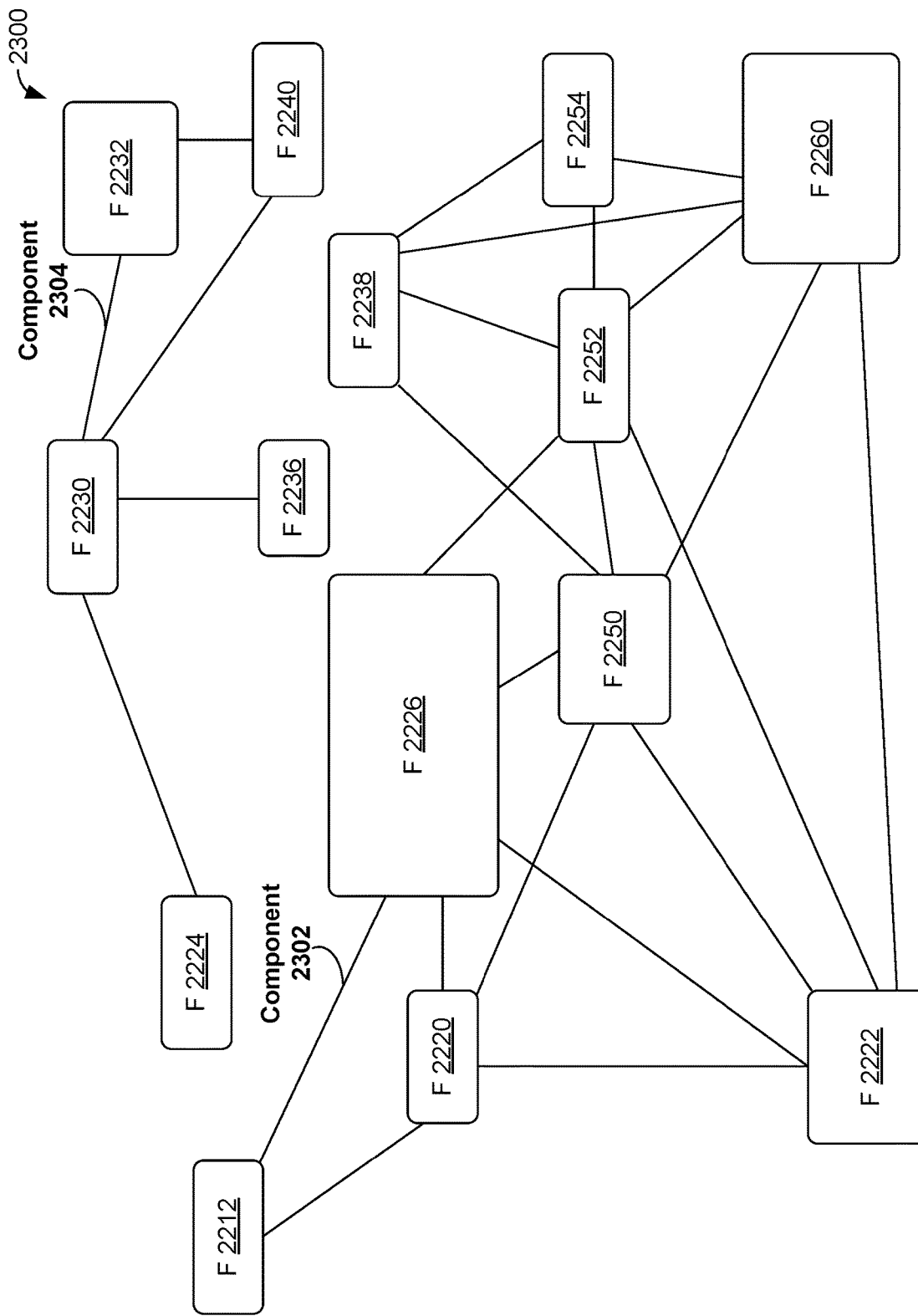
FIG. 23 is a block diagram of still another supply chain, in accordance with an example embodiment.

FIG. 23 shows supply chain 2300 where components 2202, 2204, and 2208 have been substantially consolidated into component 2302, and where component 2206 has been somewhat consolidated to become component 2304. FIG. 23 shows that consolidated component 2302 has nine facilities 2212, 2220, 2222, 2226, 2238, 2250, 2252, 2254, 2260, which is fewer than the thirteen facilities in components 2202, 2204, and 2208. Also, paths between facilities have changed consolidated component 2302; e.g., paths have been added between facility 2238 and each of facilities 2250, 2252, 2254, and 2260.

The addition of paths between facilities reduces and/or eliminates use of intermediate facilities in transporting goods and/or other material between facility 2238 and each of facilities 2250, 2252, 2254, and 2260. By consolidating components 2202, 2204, and 2208, partial truckloads can be reduced. For example, if a partially loaded truck PLT2202 was sent from component 2202 of supply chain 2200 to zip code ZC1 and a partially loaded truck PLT2204 was also sent from component 2204 of supply chain 2200 to zip code ZC1, then these partial truckloads can be consolidated by coordinated management of component 2302 to send one truck to zip code ZC1 rather than two partially loaded trucks. Such coordinated management of component 2302 can be provided by a herein-described warehouse and supply-chain coordinator, such as warehouse and supply-chain coordinator 100. The warehouse and supply-chain coordinator can recognize two partial truck loads going to the same destination or nearby region, such as an area covered by one zip code, determine a facility that has most, if not all, of the goods to be carried in the two partial truck loads, and send one truck from that facility with the goods to the destination or nearby region to deliver the goods of the two partial truck loads. Consolidation of truck loads can be performed based on other and/or additional reasons than geography, such as a type of goods/vehicle to be used (e.g., refrigerated goods, gas/liquid goods, use of a refrigerated truck, tanker truck, air freight, or sea vessel), a priority of the goods/shipment may continue to have partial loads for high-priority shipments and/or high-value goods).

Figure 24:
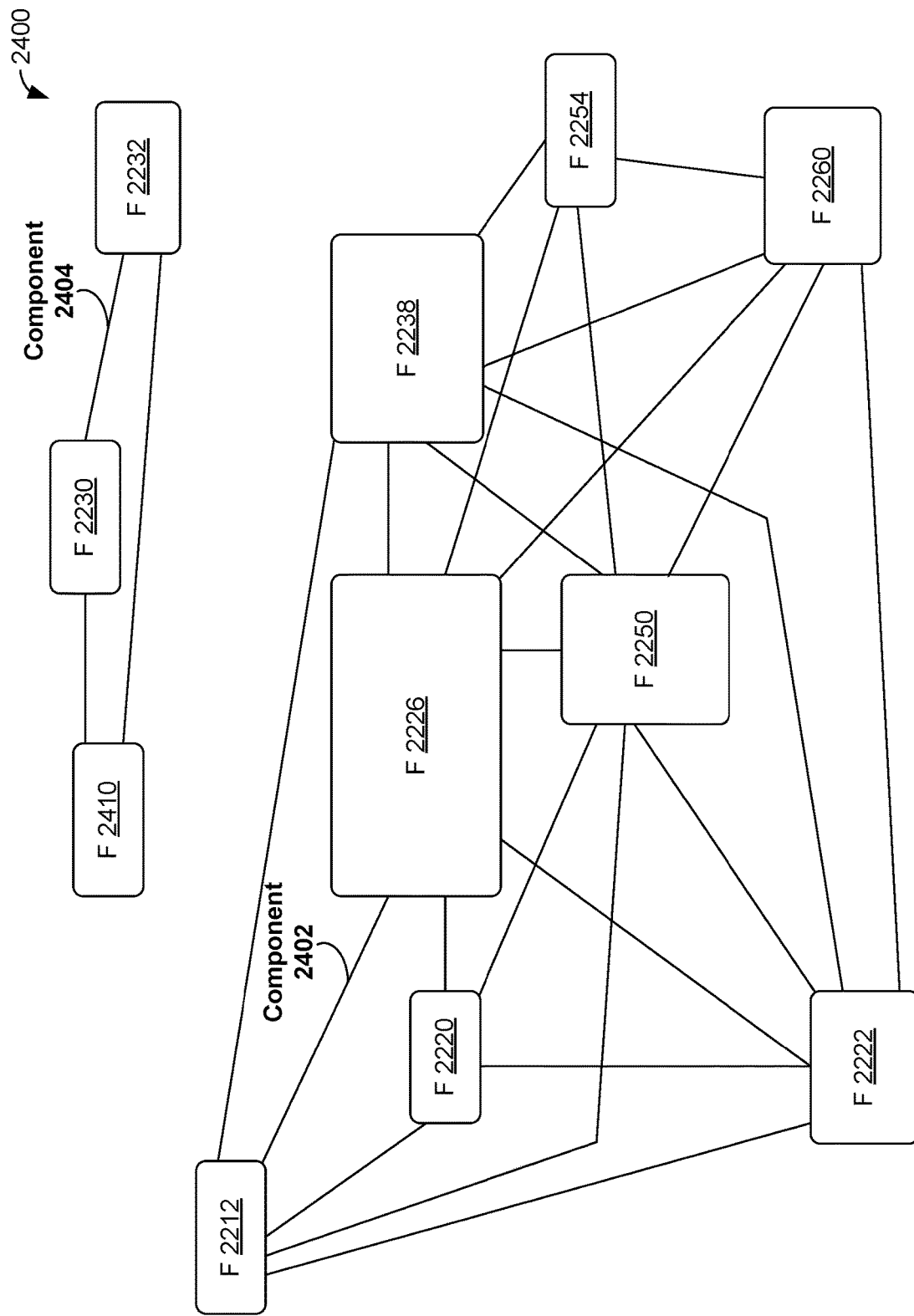
FIG. 24 is a block diagram of yet another supply chain, in accordance with an example embodiment.

FIG. 24 is a block diagram of supply chain 2400, in accordance with an example embodiment. Supply chain 2400 shows effects of further consolidation to supply chain 2300. Component 2302 of supply chain 2300 has been consolidated to become component 2402 of supply chain 2400. Component 2402 has one fewer facility and two more paths, with one facility—facility 2226—being directly connected to all of the other seven facilities 2212, 2220, 2222, 2238, 2250, 2254, 2260 of component 2402, while no facility of component 2302 was directly connected to all other facilities of that component. With fewer facilities and more paths than in component 2302, fewer facilities have to be maintained and fewer intermediate facilities are likely to be used in component 2402, and thus making component 2402 more time-efficient and cost-effective than component 2302.

Also, component 2404 has been consolidated to use only three facilities—facilities 2230, 2232, and 2410—which are all directly interconnected. In comparison, component 2304 of supply chain 2300 used five facilities, only one of which was fully connected. With fewer facilities and more paths than in component 2304, fewer facilities have to be maintained and fewer intermediate facilities are likely to be used in component 2404, and thus making component 2404 more time-efficient and cost-effective than component 2304.

In some examples, component 2402, component 2404, and/or supply chain 2400 is configured, such as by the herein-described warehouse and supply-chain coordinator, to provide on-demand logistics and/or supply chain services; i.e., provide logistics as a service in a similar fashion to cloud computing devices provide various computing services on demand. That is, the warehouse and supply-chain coordinator enables reception of an order from a customer for warehousing, transportation, goods manufacture, supply provisioning, and/or other various logistics/supply-chain related services, and component 2402, component 2404, and/or supply chain 2400 provides those services to the customer without the customer having to manage details of where goods are stored, transportation of goods through the supply chain, obtaining goods from suppliers and manufacturers, and supervision of warehouses.

CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method comprising:
   maintaining, by an order routing system, an inventory database for each warehouse of a plurality of warehouses, wherein a plurality of robots are deployed at each warehouse, wherein the inventory database for each warehouse is updated based on messages sent by the plurality of robots at the warehouse during performance of tasks by the plurality of robots at the warehouse;
   receiving an order;
   determining, for each warehouse of the plurality of warehouses, a projected availability time for an item that satisfies the order to be available for pickup at the warehouse based on the inventory database for the warehouse;
   determining a level of visibility of the order routing system into each warehouse of the plurality of warehouses, wherein the level of visibility into a warehouse is based on an amount of information available to the order routing system from the plurality of robots at the warehouse and a warehouse management system which controls the plurality of robots at the warehouse;
   selecting a warehouse from the plurality of warehouses based on the projected availability time determined for each warehouse of the plurality of warehouses and on the determined level of visibility of the order routing system into each warehouse of the plurality of warehouses; and
   causing at least one robot at the selected warehouse to prepare for pickup the item that satisfies the order at the selected warehouse.

2. The method of claim 1, further comprising updating the inventory database for each warehouse based on scans of arriving inventory and deporting inventory performed at a loading dock by the plurality of robots at the warehouse.

3. The method of claim 1, wherein the inventory database for each warehouse includes locations of inventory items within the warehouse, and wherein the projected availability time determined for each warehouse is based on the locations of the inventory items within the warehouse.

4. The method of claim 3, further comprising, for each warehouse, updating the locations of the inventory items within the warehouse in response to detections of on-item identifiers on the inventory items by sensors on one or more of the plurality of robots.

5. The method of claim 1, wherein the inventory database for each warehouse includes metrology information for inventory items within the warehouse, and wherein the projected availability time determined for each warehouse is based on the metrology information for the inventory items.

6. The method of claim 5, further comprising, for each warehouse, determining the metrology information for the inventory items within the warehouse using sensor data from sensors on one or more of the plurality of robots.

7. The method of claim 1, wherein determining the projected availability time for a warehouse comprises determining a time at which at least one robot at the warehouse is projected to move the item at the warehouse that satisfies the order to a loading dock of the warehouse.

8. The method of claim 7, further comprising determining at least one queue of future tasks for the at least one robot, wherein the projected availability time for the warehouse is based on the at least one queue of future tasks for the at least one robot.

9. The method of claim 1, further comprising:
   receiving scheduling information for the plurality of robots at each of the plurality of warehouses; and
   determining the projected availability time for each of the plurality of warehouses based on the scheduling information.

10. The method of claim 1, further comprising:
    determining, for each warehouse, a projected arrival time by which a delivery vehicle from a plurality of delivery vehicles is expected to reach the warehouse to pick up the item that satisfies the order at the warehouse; and
    selecting the warehouse based on the projected arrival time determined for each warehouse.

11. The method of claim 10, further comprising determining, for each warehouse, a projected load time by which one or more of the plurality of robots at the warehouse are expected to have loaded the item onto the delivery vehicle based on the projected arrival time for the delivery vehicle; and
    selecting the warehouse based on the projected load time determined for each warehouse.

12. The method of claim 1, wherein determining the projected availability time for each warehouse comprises running a software simulation based on a position of the item that satisfies the order in the warehouse.

13. The method of claim 1, wherein the item that satisfies the order for the selected warehouse is not at the selected warehouse when the order is received, the method further comprising:
    determining a projected arrival time for the item that satisfies the order for the selected warehouse to reach the selected warehouse; and
    determining the projected availability time for the selected warehouse based on the projected arrival time.

14. The method of claim 13, wherein the item that satisfies the order for the selected warehouse is delivered by a delivery vehicle, and wherein the projected arrival time is determined based on a scheduled route for the delivery vehicle.

15. The method of claim 13, wherein the item that satisfies the order for the selected warehouse is delivered to the selected warehouse from a separate warehouse by a delivery vehicle, and wherein the projected arrival time is determined based scheduling information for a separate plurality of robots at the separate warehouse.

16. The method of claim 1, further comprising associating a confidence level with the projected availability time determined for each warehouse of the plurality of warehouses based on the determined level of visibility of the order routing system into each warehouse of the plurality of warehouses, wherein selecting the warehouse is based on the confidence level associated with the projected availability time determined for each warehouse.

17. The method of claim 1, wherein determining the level of visibility of the order routing system into each warehouse of the plurality of warehouses comprises:
    determining that the order routing system is in communication with a warehouse management system of a first warehouse such that the order routing system has access to robot scheduling information at the first warehouse; and determining that the order routing system is not in communication with a warehouse management system of a second warehouse.

18. The method of claim 1, wherein determining the level of visibility of the order routing system into each warehouse of the plurality of warehouses comprises determining that a first warehouse is semi-automated with both robotic actors and human actors and determining that a second warehouse is fully automated.

19. A non-transitory computer readable medium having stored therein instructions executable by one or more processors to cause the one or more processors to perform functions comprising:

maintaining, by an order routing system, an inventory database for each warehouse of a plurality of warehouses, wherein a plurality of robots are deployed at each warehouse, wherein the inventory database for each warehouse is updated based on messages sent by the plurality of robots at the warehouse during performance of tasks by the plurality of robots at the warehouse;

receiving an order;

determining, for each warehouse of the plurality of warehouses, a projected availability time for an item that satisfies the order to be available for pickup at the warehouse based on the inventory database for the warehouse;

determining a level of visibility of the order routing system into each warehouse of the plurality of warehouses, wherein the level of visibility into a warehouse is based on an amount of information available to the order routing system from the plurality of robots at the warehouse and a warehouse management system which controls the plurality of robots at the warehouse;

selecting a warehouse from the plurality of warehouses based on the projected availability time determined for each warehouse of the plurality of warehouses and on the determined level of visibility of the order routing system into each warehouse of the plurality of warehouses; and causing at least one robot at the selected warehouse to prepare for pickup the item that satisfies the order at the selected warehouse.

20. A system comprising:

a plurality of robots deployed at each of a plurality of warehouses; and an order routing system configured to:

maintain an inventory database for each warehouse of the plurality of warehouses, wherein the inventory database for each warehouse is updated based on messages sent by the plurality of robots at the warehouse during performance of tasks by the plurality of robots at the warehouse;

receive an order;

determine, for each warehouse of the plurality of warehouses, a projected availability time for an item that satisfies the order to be available for pickup at the warehouse based on the inventory database for the warehouse;

determine a level of visibility of the order routing system into each warehouse of the plurality of warehouses, wherein the level of visibility into a warehouse is based on an amount of information available to the order routing system from the plurality of robots at the warehouse and a warehouse management system which controls the plurality of robots at the warehouse;

select a warehouse from the plurality of warehouses based on the projected availability time determined for each warehouse of the plurality of warehouses and on the determined level of visibility of the order routing system into each warehouse of the plurality of warehouses; and cause at least one robot at the selected warehouse to prepare for pickup the item that satisfies the order at the selected warehouse.

* * * * *